(12) United States Patent
Steinberg et al.

(10) Patent No.: US 7,746,385 B2
(45) Date of Patent: Jun. 29, 2010

(54) RED-EYE FILTER METHOD AND APPARATUS

(75) Inventors: Eran Steinberg, San Francisco, CA (US); Yury Prilutsky, San Mateo, CA (US); Peter Corcoran, Claregalway (IE); Petronel Bigioi, Galway (IE); Michael J. DeLuca, Boca Raton, FL (US)

(73) Assignee: FotoNation Vision Limited, Galway (IE)

( * ) Notice: Subject to any disclaimer, the term of this patent is extended or adjusted under 35 U.S.C. 154(b) by 10 days.

(21) Appl. No.: 12/194,148

(22) Filed: Aug. 19, 2008

(65) Prior Publication Data

US 2009/0027520 A1 Jan. 29, 2009

Related U.S. Application Data

(60) Division of application No. 10/919,226, filed on Aug. 16, 2004, which is a continuation-in-part of application No. 10/772,767, filed on Feb. 4, 2004, now Pat. No. 7,352,394, which is a continuation-in-part of application No. 10/635,862, filed on Aug. 5, 2003, now Pat. No. 7,630,006, which is a continuation-in-part of application No. 10/170,511, filed on Jun. 12, 2002, now Pat. No. 7,042,505, which is a continuation of application No. 08/947,603, filed on Oct. 9, 1997, now Pat. No. 6,407,777.

(51) Int. Cl.
*H04N 5/228* (2006.01)
*H04N 5/262* (2006.01)

(52) U.S. Cl. .................. 348/222.1; 348/239; 382/274

(58) Field of Classification Search .............. 348/222.1, 348/239
See application file for complete search history.

(56) References Cited

U.S. PATENT DOCUMENTS 4,285,588 A    8/1981    Mir (Continued)

FOREIGN PATENT DOCUMENTS

EP    884694 A1    12/1998

(Continued)

OTHER PUBLICATIONS

Tatsutoshi Kitajima (JP04-192681 English Translation; Electronic Camera, Jul. 10, 1992).*

(Continued)

*Primary Examiner*—Sinh Tran
*Assistant Examiner*—Hung H Lam
(74) *Attorney, Agent, or Firm*—Andrew V. Smith

(57) ABSTRACT

A digital image acquisition system having no photographic film, such as a digital camera, has a flash unit for providing illumination during image capture and a red-eye filter for detecting a region within a captured image indicative of a red-eye phenomenon, the detection being based upon a comparison of the captured image and a reference image of nominally the same scene taken without flash. In the embodiment the reference image is a preview image of lower pixel resolution than the captured image, the filter matching the pixel resolutions of the captured and reference images by up-sampling the preview image and/or sub-sampling the captured image. The filter also aligns at least portions of the captured image and reference image prior to comparison to allow for, e.g. movement in the subject.

23 Claims, 10 Drawing Sheets

U.S. PATENT DOCUMENTS

| | | |
|---|---|---|
| 4,577,219 A | 3/1986 | Klie et al. |
| 4,646,134 A | 2/1987 | Komatsu et al. |
| 4,777,620 A | 10/1988 | Shimoni et al. |
| 4,881,067 A | 11/1989 | Watanabe et al. |
| 4,978,989 A | 12/1990 | Nakano et al. |
| 5,016,107 A | 5/1991 | Sasson et al. |
| 5,070,355 A | 12/1991 | Inoue et al. |
| 5,130,789 A | 7/1992 | Dobbs et al. |
| 5,164,831 A | 11/1992 | Kuchta et al. |
| 5,202,720 A | 4/1993 | Fujino et al. |
| 5,249,053 A | 9/1993 | Jain |
| 5,274,457 A | 12/1993 | Kobayashi et al. |
| 5,301,026 A | 4/1994 | Lee |
| 5,303,049 A | 4/1994 | Ejima et al. |
| 5,335,072 A | 8/1994 | Tanaka et al. |
| 5,384,601 A | 1/1995 | Yamashita et al. |
| 5,400,113 A | 3/1995 | Sosa et al. |
| 5,432,863 A | 7/1995 | Benati et al. |
| 5,432,866 A | 7/1995 | Sakamoto |
| 5,452,048 A | 9/1995 | Edgar |
| 5,455,606 A | 10/1995 | Keeling et al. |
| 5,537,516 A | 7/1996 | Sherman et al. |
| 5,568,187 A | 10/1996 | Okino |
| 5,568,194 A | 10/1996 | Abe |
| 5,671,013 A | 9/1997 | Nakao |
| 5,694,926 A | 12/1997 | DeVries et al. |
| 5,719,639 A | 2/1998 | Imamura |
| 5,719,951 A | 2/1998 | Shackleton et al. |
| 5,724,456 A | 3/1998 | Boyack et al. |
| 5,734,425 A | 3/1998 | Takizawa et al. |
| 5,748,764 A | 5/1998 | Benati et al. |
| 5,748,784 A | 5/1998 | Sugiyama |
| 5,751,836 A | 5/1998 | Wildes et al. |
| 5,761,550 A | 6/1998 | Kancigor |
| 5,781,650 A | 7/1998 | Lobo et al. |
| 5,805,720 A | 9/1998 | Suenaga et al. |
| 5,805,727 A | 9/1998 | Nakano |
| 5,805,745 A | 9/1998 | Graf |
| 5,815,749 A | 9/1998 | Tsukahara et al. |
| 5,818,975 A | 10/1998 | Goodwin et al. |
| 5,847,714 A | 12/1998 | Naqvi et al. |
| 5,850,470 A | 12/1998 | Kung et al. |
| 5,862,217 A | 1/1999 | Steinberg et al. |
| 5,862,218 A | 1/1999 | Steinberg |
| 5,892,837 A | 4/1999 | Luo et al. |
| 5,949,904 A | 9/1999 | Delp |
| 5,974,189 A | 10/1999 | Nicponski |
| 5,990,973 A | 11/1999 | Sakamoto |
| 5,991,456 A | 11/1999 | Rahman et al. |
| 5,991,549 A | 11/1999 | Tsuchida |
| 5,991,594 A | 11/1999 | Froeber et al. |
| 5,999,160 A | 12/1999 | Kitamura et al. |
| 6,006,039 A | 12/1999 | Steinberg et al. |
| 6,009,209 A | 12/1999 | Acker et al. |
| 6,011,547 A | 1/2000 | Shiota et al. |
| 6,016,354 A | 1/2000 | Lin et al. |
| 6,028,611 A | 2/2000 | Anderson et al. |
| 6,035,072 A | 3/2000 | Read |
| 6,035,074 A | 3/2000 | Fujimoto et al. |
| 6,036,072 A | 3/2000 | Lee |
| 6,101,271 A | 8/2000 | Yamashita et al. |
| 6,104,839 A | 8/2000 | Cok et al. |
| 6,118,485 A | 9/2000 | Hinoue et al. |
| 6,134,339 A | 10/2000 | Luo |
| 6,151,403 A | 11/2000 | Luo |
| 6,172,706 B1 | 1/2001 | Tatsumi |
| 6,192,149 B1 | 2/2001 | Eschbach et al. |
| 6,195,127 B1 | 2/2001 | Sugimoto |
| 6,201,571 B1 | 3/2001 | Ota |
| 6,204,858 B1 | 3/2001 | Gupta |
| 6,233,364 B1 | 5/2001 | Krainiouk et al. |
| 6,249,315 B1 | 6/2001 | Holm |
| 6,252,976 B1 | 6/2001 | Schildkraut et al. |
| 6,266,054 B1 | 7/2001 | Lawton et al. |
| 6,268,939 B1 | 7/2001 | Klassen et al. |
| 6,275,614 B1 | 8/2001 | Krishnamurthy et al. |
| 6,278,491 B1 | 8/2001 | Wang et al. |
| 6,285,410 B1 | 9/2001 | Marni |
| 6,292,574 B1 | 9/2001 | Schildkraut et al. |
| 6,295,378 B1 | 9/2001 | Kitakado et al. |
| 6,298,166 B1 | 10/2001 | Ratnakar et al. |
| 6,300,935 B1 | 10/2001 | Sobel et al. |
| 6,381,345 B1 | 4/2002 | Swain |
| 6,393,148 B1 | 5/2002 | Bhaskar |
| 6,396,963 B2 | 5/2002 | Shaffer et al. |
| 6,407,777 B1 | 6/2002 | DeLuca |
| 6,421,468 B1 | 7/2002 | Ratnakar et al. |
| 6,426,775 B1 | 7/2002 | Kurokawa |
| 6,429,924 B1 | 8/2002 | Milch |
| 6,433,818 B1 | 8/2002 | Steinberg et al. |
| 6,438,264 B1 | 8/2002 | Gallagher et al. |
| 6,441,854 B2 | 8/2002 | Fellegara et al. |
| 6,459,436 B1 | 10/2002 | Kumada et al. |
| 6,473,199 B1 | 10/2002 | Gilman et al. |
| 6,496,655 B1 | 12/2002 | Malloy Desormeaux |
| 6,501,911 B1 | 12/2002 | Malloy Desormeaux |
| 6,505,003 B1 | 1/2003 | Malloy Desormeaux |
| 6,510,520 B1 | 1/2003 | Steinberg |
| 6,516,154 B1 | 2/2003 | Parulski et al. |
| 6,614,471 B1 | 9/2003 | Ott |
| 6,614,995 B2 | 9/2003 | Tseng |
| 6,621,867 B1 | 9/2003 | Sazzad et al. |
| 6,628,833 B1 | 9/2003 | Horie |
| 6,700,614 B1 | 3/2004 | Hata |
| 6,707,950 B1 | 3/2004 | Burns et al. |
| 6,714,665 B1 | 3/2004 | Hanna et al. |
| 6,718,051 B1 | 4/2004 | Eschbach |
| 6,724,941 B1 | 4/2004 | Aoyama |
| 6,728,401 B1 | 4/2004 | Hardeberg |
| 6,765,686 B2 | 7/2004 | Maruoka |
| 6,786,655 B2 | 9/2004 | Cook et al. |
| 6,792,161 B1 | 9/2004 | Imaizumi et al. |
| 6,798,913 B2 | 9/2004 | Toriyama |
| 6,859,565 B2 | 2/2005 | Baron |
| 6,873,743 B2 | 3/2005 | Steinberg |
| 6,885,766 B2 | 4/2005 | Held et al. |
| 6,895,112 B2 | 5/2005 | Chen et al. |
| 6,900,882 B2 | 5/2005 | Iida |
| 6,912,298 B1 | 6/2005 | Wilensky |
| 6,937,997 B1 | 8/2005 | Parulski |
| 6,967,680 B1 | 11/2005 | Kagle et al. |
| 6,980,691 B2 | 12/2005 | Nesterov et al. |
| 6,984,039 B2 | 1/2006 | Agostinelli |
| 7,024,051 B2 | 4/2006 | Miller et al. |
| 7,027,662 B2 | 4/2006 | Baron |
| 7,035,461 B2 | 4/2006 | Luo et al. |
| 7,035,462 B2 | 4/2006 | White et al. |
| 7,042,501 B1 | 5/2006 | Matama |
| 7,042,505 B1 | 5/2006 | DeLuca |
| 7,062,086 B2 | 6/2006 | Chen et al. |
| 7,116,820 B2 | 10/2006 | Luo et al. |
| 7,133,070 B2 | 11/2006 | Wheeler et al. |
| 7,155,058 B2 | 12/2006 | Gaubatz et al. |
| 7,216,289 B2 | 5/2007 | Kagle et al. |
| 7,224,850 B2 | 5/2007 | Zhang et al. |
| 7,269,292 B2 | 9/2007 | Steinberg |
| 7,289,664 B2 | 10/2007 | Enomoto |
| 7,295,233 B2 | 11/2007 | Steinberg et al. |
| 7,310,443 B1 | 12/2007 | Kris et al. |
| 7,315,631 B1 | 1/2008 | Corcoran et al. |
| 7,336,821 B2 | 2/2008 | Ciuc et al. |
| 7,352,394 B1 | 4/2008 | DeLuca et al. |
| 7,362,368 B2 | 4/2008 | Steinberg et al. |
| 7,369,712 B2 | 5/2008 | Steinberg et al. |

| Patent No. | Date | Inventor |
|---|---|---|
| 7,403,643 B2 | 7/2008 | Ianculescu et al. |
| 7,436,998 B2 | 10/2008 | Steinberg et al. |
| 7,454,040 B2 | 11/2008 | Luo et al. |
| 7,515,740 B2 | 4/2009 | Corcoran et al. |
| 2001/0015760 A1 | 8/2001 | Fellegara et al. |
| 2001/0031142 A1 | 10/2001 | Whiteside |
| 2001/0052937 A1 | 12/2001 | Suzuki |
| 2002/0019859 A1 | 2/2002 | Watanabe |
| 2002/0041329 A1 | 4/2002 | Steinberg |
| 2002/0051571 A1 | 5/2002 | Jackway et al. |
| 2002/0054224 A1 | 5/2002 | Wasula et al. |
| 2002/0085088 A1 | 7/2002 | Eubanks |
| 2002/0090133 A1 | 7/2002 | Kim et al. |
| 2002/0093577 A1 | 7/2002 | Kitawaki et al. |
| 2002/0093633 A1 | 7/2002 | Milch |
| 2002/0105662 A1 | 8/2002 | Patton et al. |
| 2002/0114513 A1 | 8/2002 | Hirao |
| 2002/0126893 A1 | 9/2002 | Held et al. |
| 2002/0131770 A1 | 9/2002 | Meier et al. |
| 2002/0136450 A1 | 9/2002 | Chen et al. |
| 2002/0141661 A1 | 10/2002 | Steinberg |
| 2002/0150306 A1 | 10/2002 | Baron |
| 2002/0159630 A1 | 10/2002 | Buzuloiu et al. |
| 2002/0172419 A1 | 11/2002 | Lin et al. |
| 2002/0176623 A1 | 11/2002 | Steinberg |
| 2003/0007687 A1 | 1/2003 | Nesterov et al. |
| 2003/0021478 A1 | 1/2003 | Yoshida |
| 2003/0025811 A1 | 2/2003 | Keelan et al. |
| 2003/0044063 A1 | 3/2003 | Meckes et al. |
| 2003/0044070 A1 | 3/2003 | Fuersich et al. |
| 2003/0044176 A1 | 3/2003 | Saitoh |
| 2003/0044177 A1 | 3/2003 | Oberhardt et al. |
| 2003/0044178 A1 | 3/2003 | Oberhardt et al. |
| 2003/0052991 A1 | 3/2003 | Stavely et al. |
| 2003/0058343 A1 | 3/2003 | Katayama |
| 2003/0058349 A1 | 3/2003 | Takemoto |
| 2003/0095197 A1 | 5/2003 | Wheeler et al. |
| 2003/0107649 A1 | 6/2003 | Flickner et al. |
| 2003/0118216 A1 | 6/2003 | Goldberg |
| 2003/0137597 A1 | 7/2003 | Sakamoto et al. |
| 2003/0142285 A1 | 7/2003 | Enomoto |
| 2003/0161506 A1* | 8/2003 | Velazquez et al. ............ 382/118 |
| 2003/0194143 A1 | 10/2003 | Iida |
| 2003/0202715 A1 | 10/2003 | Kinjo |
| 2004/0017481 A1 | 1/2004 | Takasumi et al. |
| 2004/0027593 A1 | 2/2004 | Wilkins |
| 2004/0032512 A1 | 2/2004 | Silverbrook |
| 2004/0032526 A1 | 2/2004 | Silverbrook |
| 2004/0033071 A1 | 2/2004 | Kubo |
| 2004/0037460 A1 | 2/2004 | Luo et al. |
| 2004/0046878 A1* | 3/2004 | Jarman ....................... 348/239 |
| 2004/0047491 A1 | 3/2004 | Rydbeck |
| 2004/0056975 A1 | 3/2004 | Hata |
| 2004/0057623 A1 | 3/2004 | Schuhrke et al. |
| 2004/0057705 A1 | 3/2004 | Kohno |
| 2004/0057715 A1 | 3/2004 | Tsuchida et al. |
| 2004/0090461 A1 | 5/2004 | Adams |
| 2004/0093432 A1 | 5/2004 | Luo et al. |
| 2004/0114796 A1 | 6/2004 | Kaku |
| 2004/0114797 A1 | 6/2004 | Meckes |
| 2004/0114829 A1 | 6/2004 | LeFeuvre et al. |
| 2004/0114909 A1 | 6/2004 | Seo et al. |
| 2004/0119851 A1 | 6/2004 | Kaku |
| 2004/0120598 A1 | 6/2004 | Feng |
| 2004/0125387 A1 | 7/2004 | Nagao et al. |
| 2004/0126086 A1 | 7/2004 | Nakamura et al. |
| 2004/0141657 A1 | 7/2004 | Jarman |
| 2004/0150743 A1 | 8/2004 | Schinner |
| 2004/0160517 A1 | 8/2004 | Iida |
| 2004/0165215 A1 | 8/2004 | Raguet et al. |
| 2004/0184044 A1 | 9/2004 | Kolb et al. |
| 2004/0184670 A1 | 9/2004 | Jarman et al. |
| 2004/0196292 A1 | 10/2004 | Okamura |
| 2004/0196503 A1 | 10/2004 | Kurtenbach et al. |
| 2004/0213476 A1 | 10/2004 | Luo et al. |
| 2004/0223063 A1 | 11/2004 | DeLuca et al. |
| 2004/0227978 A1 | 11/2004 | Enomoto |
| 2004/0228542 A1 | 11/2004 | Zhang et al. |
| 2004/0233299 A1 | 11/2004 | Ioffe et al. |
| 2004/0233301 A1 | 11/2004 | Nakata et al. |
| 2004/0234156 A1 | 11/2004 | Watanabe et al. |
| 2004/0239779 A1 | 12/2004 | Washisu |
| 2004/0240747 A1 | 12/2004 | Jarman et al. |
| 2004/0258308 A1 | 12/2004 | Sadovsky et al. |
| 2005/0001024 A1 | 1/2005 | Kusaka et al. |
| 2005/0013602 A1 | 1/2005 | Ogawa |
| 2005/0013603 A1 | 1/2005 | Ichimasa |
| 2005/0024498 A1 | 2/2005 | Iida et al. |
| 2005/0031224 A1 | 2/2005 | Prilutsky et al. |
| 2005/0041121 A1 | 2/2005 | Steinberg et al. |
| 2005/0047655 A1 | 3/2005 | Luo et al. |
| 2005/0047656 A1 | 3/2005 | Luo et al. |
| 2005/0053279 A1 | 3/2005 | Chen et al. |
| 2005/0058340 A1 | 3/2005 | Chen et al. |
| 2005/0058342 A1 | 3/2005 | Chen et al. |
| 2005/0062856 A1 | 3/2005 | Matsushita |
| 2005/0063083 A1 | 3/2005 | Dart et al. |
| 2005/0068452 A1 | 3/2005 | Steinberg et al. |
| 2005/0074164 A1 | 4/2005 | Yonaha |
| 2005/0074179 A1 | 4/2005 | Wilensky |
| 2005/0078191 A1 | 4/2005 | Battles |
| 2005/0117132 A1 | 6/2005 | Agostinelli |
| 2005/0129331 A1 | 6/2005 | Kakiuchi et al. |
| 2005/0140801 A1 | 6/2005 | Prilutsky et al. |
| 2005/0147278 A1 | 7/2005 | Rui et al. |
| 2005/0151943 A1 | 7/2005 | Iida |
| 2005/0163498 A1 | 7/2005 | Battles et al. |
| 2005/0168965 A1 | 8/2005 | Yoshida |
| 2005/0196067 A1 | 9/2005 | Gallagher et al. |
| 2005/0200736 A1 | 9/2005 | Ito |
| 2005/0207649 A1 | 9/2005 | Enomoto et al. |
| 2005/0212955 A1 | 9/2005 | Craig et al. |
| 2005/0219385 A1 | 10/2005 | Terakawa |
| 2005/0219608 A1 | 10/2005 | Wada |
| 2005/0220346 A1 | 10/2005 | Akahori |
| 2005/0220347 A1 | 10/2005 | Enomoto et al. |
| 2005/0226499 A1 | 10/2005 | Terakawa |
| 2005/0232490 A1 | 10/2005 | Itagaki et al. |
| 2005/0238230 A1 | 10/2005 | Yoshida |
| 2005/0243348 A1 | 11/2005 | Yonaha |
| 2005/0275734 A1 | 12/2005 | Ikeda |
| 2005/0276481 A1 | 12/2005 | Enomoto |
| 2005/0280717 A1 | 12/2005 | Sugimoto |
| 2005/0286766 A1 | 12/2005 | Ferman |
| 2006/0008171 A1 | 1/2006 | Petschnigg et al. |
| 2006/0017825 A1 | 1/2006 | Thakur |
| 2006/0038916 A1 | 2/2006 | Knoedgen et al. |
| 2006/0039690 A1 | 2/2006 | Steinberg et al. |
| 2006/0045352 A1 | 3/2006 | Gallagher |
| 2006/0050300 A1 | 3/2006 | Mitani et al. |
| 2006/0066628 A1 | 3/2006 | Brodie et al. |
| 2006/0082847 A1 | 4/2006 | Sugimoto |
| 2006/0093212 A1 | 5/2006 | Steinberg et al. |
| 2006/0093213 A1 | 5/2006 | Steinberg et al. |
| 2006/0093238 A1 | 5/2006 | Steinberg et al. |
| 2006/0098867 A1 | 5/2006 | Gallagher |
| 2006/0098875 A1 | 5/2006 | Sugimoto |
| 2006/0119832 A1 | 6/2006 | Iida |
| 2006/0120599 A1 | 6/2006 | Steinberg et al. |
| 2006/0140455 A1 | 6/2006 | Costache et al. |
| 2006/0150089 A1 | 7/2006 | Jensen et al. |
| 2006/0203108 A1 | 9/2006 | Steinberg et al. |
| 2006/0204052 A1 | 9/2006 | Yokouchi |
| 2006/0204110 A1 | 9/2006 | Steinberg et al. |
| 2006/0221408 A1 | 10/2006 | Fukuda |
| 2006/0285754 A1 | 12/2006 | Steinberg et al. |

| | | | |
|---|---|---|---|
| 2007/0110305 | A1 | 5/2007 | Corcoran et al. |
| 2007/0116379 | A1 | 5/2007 | Corcoran et al. |
| 2007/0116380 | A1 | 5/2007 | Ciuc et al. |
| 2007/0133863 | A1* | 6/2007 | Sakai et al. ............... 382/151 |
| 2007/0201724 | A1 | 8/2007 | Steinberg et al. |
| 2007/0263104 | A1 | 11/2007 | DeLuca et al. |
| 2008/0002060 | A1 | 1/2008 | DeLuca et al. |
| 2008/0013798 | A1 | 1/2008 | Ionita et al. |
| 2008/0043121 | A1 | 2/2008 | Prilutsky et al. |
| 2008/0112599 | A1 | 5/2008 | Nanu et al. |
| 2008/0144965 | A1 | 6/2008 | Steinberg et al. |
| 2008/0186389 | A1 | 8/2008 | DeLuca et al. |
| 2008/0211937 | A1 | 9/2008 | Steinberg et al. |
| 2008/0232711 | A1 | 9/2008 | Prilutsky et al. |
| 2008/0240555 | A1 | 10/2008 | Nanu et al. |

FOREIGN PATENT DOCUMENTS

| | | | |
|---|---|---|---|
| EP | 911759 | A2 | 4/1999 |
| EP | 911759 | A3 | 6/2000 |
| EP | 1199672 | A2 | 4/2002 |
| EP | 1229486 | A1 | 8/2002 |
| EP | 1288858 | A1 | 3/2003 |
| EP | 1288859 | A1 | 3/2003 |
| EP | 1288860 | A1 | 3/2003 |
| EP | 1293933 | A1 | 3/2003 |
| EP | 1296510 | A2 | 3/2003 |
| EP | 1429290 | A2 | 6/2004 |
| EP | 1478169 | A2 | 11/2004 |
| EP | 1528509 | A2 | 5/2005 |
| EP | 979487 | B1 | 3/2006 |
| EP | 1429290 | B1 | 7/2008 |
| GB | 841609 | A | 7/1960 |
| JP | 4192681 | A2 | 7/1992 |
| JP | 5224271 | A2 | 9/1993 |
| JP | 9214839 | A2 | 8/1997 |
| JP | 20134486 | A2 | 5/2000 |
| JP | 22247596 | A2 | 8/2002 |
| JP | 22271808 | A2 | 9/2002 |
| JP | 2003-030647 | * | 1/2003 |
| WO | WO-9802844 | A1 | 1/1998 |
| WO | WO-9917254 | A1 | 4/1999 |
| WO | WO-9933684 | A2 | 7/1999 |
| WO | WO-0107142 | A1 | 9/2001 |
| WO | WO-0192614 | A1 | 12/2001 |
| WO | WO-0245003 | A1 | 6/2002 |
| WO | WO-03026278 | A1 | 3/2003 |
| WO | WO-03071484 | A1 | 8/2003 |
| WO | WO-2004034696 | A1 | 4/2004 |
| WO | WO-2005015896 | A1 | 2/2005 |
| WO | WO-2005041558 | A1 | 5/2005 |
| WO | WO-2005076217 | A2 | 8/2005 |
| WO | WO-2005076217 | A3 | 8/2005 |
| WO | WO-2005087994 | A1 | 9/2005 |
| WO | WO-2005109853 | A1 | 11/2005 |
| WO | WO-2006011635 | A1 | 2/2006 |
| WO | WO-2006018056 | A1 | 2/2006 |
| WO | WO-2006045441 | A1 | 5/2006 |
| WO | WO-2007057063 | A1 | 5/2007 |
| WO | WO-2007057064 | A1 | 5/2007 |
| WO | WO-2007093199 | A2 | 8/2007 |
| WO | WO-2007093199 | A3 | 8/2007 |
| WO | WO-2007095553 | A2 | 8/2007 |
| WO | WO-2007095553 | A3 | 8/2007 |
| WO | WO-2007142621 | A1 | 12/2007 |
| WO | WO-2008023280 | A2 | 2/2008 |
| WO | WO-2008109644 | A2 | 9/2008 |
| WO | WO-2008109644 | A3 | 9/2008 |

OTHER PUBLICATIONS

Combier, Nathalie et al., "Removal of Defects on Flash Radiographic Images by Fuzzy Combination, Conference: Machine Vision Applications in Industrial Inspection III, http://rlinks2.dialog.com/NASApp/ChannelWEB/DialogProServlet?ChName=engineering". Proceedings of SPIE—The International Society for Optical Engineering, Society of Photo-Optical Instrumentation, 1995, pp. 301-312.

Corcoran, P. et al., "Automated In-Camera Detection of Flash-Eye Defects", IEEE Transactions on Consumer Electronics, 2005, pp. 11-17, vol. 51—Issue 1.

Cucchiara, R. et al., "Detection of Luminosity Profiles of Elongated Shapes", International Conference on Image Processing, 1996, pp. 635-638, vol. 3.

EPO Communication pursuant to Article 94(3) EPC, for European Patent Application No. 05 792 584.4, paper dated May 13, 2008, 8 pages.

European Patent Office, Communication pursuant to Article 94(3) EPC for Application No. 04763763.2, dated Mar. 7, 2008, 7 pages.

European Patent Office, Communication pursuant to Article 96(2) EPC for Application No. 04763763.2, dated Aug. 29, 2006, 4 pages.

Examination Report for European patent application No. 05792584.4, dated May 13, 2008, 8 pgs.

Gaubatz, Matthew et al., "Automatic Red-Eye Detection and Correction", IEEE ICIP, Proceedings 2002 Intl Conference Image Processing, 2002, pp. 1-804-1-807, vol. 2—Issue 3.

Han, T. et al., "Detection and Correction of abnormal Pixels In Hyperion Images", IEEE International Symposium on Geoscience and Remote Sensing, 2002, pp. 1327-1330, vol. 3.

Ilvarinen, J. et al., "Content-Based Retrieval of Defect Images, http://www.cs.tut.fi/.about.avisa/digger/Publications/acivs02.pdf", Proceedings of Advanced Concepts for Intelligent Vision, Laboratory of Computer Information Science, 2002.

Ioffe, S., "Red eye detection with machine learning", Proceedings 2003 International Conference on Image Processing, 2003, pp. 871-874, vol. 2—Issue 3.

Ito, M., "An Automated System for LSI Fine Pattern Inspection Based on Comparison of Sem Images and Cad Data", IEEE International Conference on Robotics and Automation, 1995, pp. 544-549, vol. 1.

Jin, B. et al., "Modeling and Analysis of Soft-Test/Repair for CCD-Based Digital X-Ray Systems", Instrumentation and Measurement, IEEE Trans, 2003, pp. 1713-1721, vol. 52—Issue 6.

Nguyen, Karlene et al., "Differences in the Infared Bright Pupil Response of Human Eyes", Proceedings of the 2002 symposium on Eye tracking research and applications, 2002, pp. 133-138.

Patent Abstracts of Japan, publication No. 2000050062, Image Input Device, application No. 10-217124, published Feb. 18, 2000, 1 page.

PCT International Preliminary Report on Patentability (IPRP) for PCT Application PCT/EP2005/011010, dated Jan. 23, 2007, 18 pages. cited by other.

PCT International Preliminary Report on Patentability for PCT Application No. PCT/EP2005/005907, dated Nov. 15, 2006, 8 pages.

PCT International Preliminary Report on Patentability for PCT Application PCT/EP2004/008706, dated Feb. 6, 2006, 7 pages.

PCT International Preliminary Report on Patentability for PCT Application PCT/EP2004/010199, dated Apr. 3, 2006, 7 pages.

PCT International Search Report and the Written Opinion of the International Searching Authority, or the Declaration, for PCT Application No. PCT/US2008/055864, dated Jul. 30, 2008, 8 pages.

PCT International Search Report and Written Opinion of the International Searching Authority for PCT Application No. PCT/EP2004/008706, dated Nov. 19, 2004, 13 pages.

PCT International Search Report and Written Opinion of the International Searching Authority for PCT Application No. PCT/EP2005/005033.

PCT Notification Concerning Transmittal of International Preliminary Report on Patentability, for PCT Application No. PCT/US2007/062090, dated Aug. 28, 2008, 6 pages.

PCT Notification of Transmittal of the International Search Report and the Written Opinion of the International Searching Authority, or the Declaration (PCT/EP2006/008342), dated Dec. 28, 2006.

PCT Notification of Transmittal of the International Search Report and the Written Opinion of the International Searching Authority, or the Declaration for PCT Application No. PCT/US07/62090 issued Mar. 10, 2008, 10 pages.

PCT Notification of Transmittal of the International Search Report and Written Opinion of the International Searching Authority, or the Declaration for PCT/EP/2005/011010, dated Jan. 23, 2006, 14 pages.

PCT Notification of Transmittal of the International Search Report and the Written Opinion of the International Searching Authority, or the Declaration for PCT/EP/2005/05907, dated Aug. 1, 2005, 12 pages.

PCT Notification of Transmittal of the International Search Report and the Written Opinion of the International Searching Authority, or the Declaration, for PCT Application No. PCT/EP2006/008358, Dec. 5, 2006, 14 pages.

PCT Notification of Transmittal of the International Search Report and the Written Opinion of the International Searching Authority, or the Declaration, for PCT Application No. PCT/US2008/055964, paper dated Jul. 30, 2008, 8 Pages.

PCT Notification of Transmittal of the International Search Report and the Written Opinion of the International Searching Authority, or the Declaration, for PCT/EP2004/010199, paper dated Dec. 13, 2004, 13 pages.

PCT Notification of Transmittal of the International Search Report and Written Opinion of the International Searching Authority for PCT Application No. PCT/EP2005/001171, (11 pages).

Plotnikov, Yuri et al., "Advanced Image Processing for Defect Visualization in Infared Thermography, http://citeseer.ist.psu.edu/plotnikov98advanced.html", NASA Langley Research Center, M.S. Posted: ACM Portal, 1998.

Plotnikov, Yuri et al., Winfree, "Visualization of Subsurface Defects in Composites Using a Focal Plane Array Infared Camera , http://citeseer.ist.psu.edu/357066.html", NASA Langley Research Center, 1999.

Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.

Shen, Jianhong, "Inpainting and the Fundamental Problem of Image Processing". 2002, 6 pages.

Smolka, B. et al., "Towards Automatic Redeye Effect Removal, XP004416063", Pattern Recognition Letters, 2003, pp. 1767-1785, vol. 24—Issue 11 , North-Holland Publ.

Soriano, M. et al., "Making Saturated Facial Images Useful Again, XP002325961, ISSN: 0277-786X", Proceedings of The Spie, 1999, pp. 113-121, vol. 3826.

Tan, Yap-peng et al., "Robust Sequential Approach for the Detection of Defective Pixels in an Image Sensor, http:// ieeexplorejeee.org/search/freesrchabstract.jsp?arnumber=758382andisnumber=16342andpunumber=6110andk2dockey=758382©ieeecnfsandquery=%28%28%28%28images+and+defects+and+correction%29%29%29%29+%3Cin%3E", IEEE Intl Conference on Acoustics, Speech, and Signal Processing, 1999, pp. 2239-2242, vol. 4.

Toet, A., "Multiscale Color Image Enhancement, Posted online: 200208-0618:09:24.0http://ieeexplore.ieee.org/search/freesrchabstract.jsp?arnumber=146865andisnumber=3917andpunumber=1197andk2dockey=146865©ieecnfsandquery=%28%28images+and+defects+and+luminance%29%29+%3Cin%3E+metadataandpos=1", International Conference on Image Processing and its Applications, 1992, pp. 583-585.

U.S. Appl. No. 10/722,767, filed Feb. 4, 2004, by inv Michael J. DeLuca, et al.

U.S. Appl. No. 10/170,511, filed Jun. 12, 2002, inventor Michael J. DeLuca.

U.S. Appl. No. 11/217,788, filed Aug. 30, 2005, inventors Eran Steinberg, et al.

United Kingdom Search Report dated May 22, 2007, issued in Application No. GB 0701957.3.

Willamowski, J. et al., "Probabilistic Automatic Red Eye Detection and Correcton", The 18th International Conference on Pattern Recognition (ICPR'06), 2006, pp. 762-765, vol. 3, IEEE Computer Society.

* cited by examiner

RED-EYE FILTER METHOD AND APPARATUS

PRIORITY AND RELATED APPLICATIONS

This application is a divisional of Ser. No. 10/919,226 filed Aug. 16, 2004, which is a continuation-in-part (CIP) application which claims the benefit of priority to U.S. patent application Ser. No. 10/772,767, filed Feb. 4, 2004, now U.S. Pat. No. 7,352,394 issued Apr. 1, 2008, which is a CIP that claims the benefit of priority to U.S. patent application Ser. No. 10/635,862, filed Aug. 5, 2003, which is a CIP that claims the benefit of priority to U.S. patent application Ser. No. 10/170,511, filed Jun. 12, 2002, now U.S. Pat. No. 7,042,505, issued May 9, 2006, which is a continuation of U.S. patent application Ser. No. 08/947,603, filed Oct. 9, 1997, now U.S. Pat. No. 6,407,777, issued Jun. 18, 2002, which are each hereby incorporated by reference. This application is also related to U.S. patent applications Ser. Nos. 10/635,918, filed Aug. 5, 2003, and 10/773,092, filed Feb. 4, 2004.

FIELD OF THE INVENTION

The invention relates generally to the area of digital photography, and more specifically to filtering "red-eye" artefacts from a flash-induced digital camera image.

BACKGROUND OF THE INVENTION

"Red-eye" is a phenomenon in flash photography where a flash is reflected within a subject's eye and appears in a photograph as a red dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera and ambient light levels.

The red-eye phenomenon can be minimized by causing the iris to reduce the opening of the pupil. This is typically done with a "pre-flash", a flash or illumination of light shortly before a flash photograph is taken. This causes the iris to close. Unfortunately, the pre-flash is an objectionable 0.2 to 0.6 seconds prior to the flash photograph. This delay is readily discernible and easily within the reaction time of a human subject. Consequently the subject may believe the pre-flash is the actual photograph and be in a less than desirable position at the time of the actual photograph. Alternately, the subject must be informed of the pre-flash, typically loosing any spontaneity of the subject captured in the photograph.

Those familiar with the art have developed complex analysis processes operating within a camera prior to invoking a pre-flash. Various conditions are monitored prior to the photograph before the pre-flash is generated; the conditions include the ambient light level and the distance of the subject from the camera. Such a system is described in U.S. Pat. No. 5,070,355, which is hereby incorporated by reference. Although that invention minimizes the occurrences where a pre-flash is used, it does not eliminate the need for a pre-flash.

Digital cameras are becoming more popular and smaller in size. Digital cameras have several advantages over film cameras. Digital cameras eliminate the need for film as the image is digitally captured and stored in a memory array for display on a display screen on the camera itself. This allows photographs to be viewed and enjoyed virtually instantaneously as opposed to waiting for film processing. Furthermore, the digitally captured image may be downloaded to another display device such as a personal computer or color printer for further enhanced viewing. Digital cameras include microprocessors for image processing and compression and camera systems control. It is possible to exploit the computation capabilities of such microprocessors for performing operations to improve the red-eye detection and elimination. Thus, what is needed is a method of better tools for eliminating red-eye phenomenon within, for example, a digital camera having a flash unit without the distraction of a pre-flash.

U.S. Patent Application 2002/0150306 (Baron), which is hereby incorporated by reference, describes a method for the removal of flash artefacts by capturing two digital images of a subject, one with flash and one without flash, and subtracting one image from the other to provide an artefact image which is then thresholded and subtracted from the flash image. However, the technique is directed to flash artefacts in general, and not specifically to red-eye removal. There is no attempt to identify red-eye regions as compared to any other flash-induced artefacts. Indeed, there is no attempt to identify particular regions at all, since the technique is simply one of subtraction and thresholding.

BRIEF SUMMARY OF THE INVENTION

A system in accordance with the present invention there is provided a digital image acquisition system having no photographic film, comprising a portable apparatus for capturing digital images, a flash unit for providing illumination during image capture, and a red-eye filter for detecting a region within a captured image indicative of a red-eye phenomenon, said detection being based upon a comparison of said captured image and at least one reference eye color characteristic.

According to one embodiment of the invention, the at least one reference eye color characteristic includes a reference image of nominally the same scene taken without flash.

According to this embodiment, the reference image may be a preview image of lower pixel resolution than the captured image, the filter may include programming code for matching the pixel resolutions of the captured and reference images by up-sampling the preview image and/or sub-sampling the captured image.

To allow for inadvertent movement in the subject between taking the two images, preferably the filter may further include programming code for aligning at least portions of the captured image and reference image prior to said comparison.

In the embodiment the filter detects said region indicative of a red-eye phenomenon by identifying a region in the captured image at least having a color indicative of a red-eye phenomenon and comparing said identified region with the corresponding region in the reference image. The filter may further designate the region as indicative of a red-eye phenomenon if said corresponding region does not have a color indicative of a red-eye phenomenon. The decision as to whether a region has a color indicative of a red-eye phenomenon may be determined on a statistical basis as a global operation on the entire region.

According to a further embodiment, the filter includes a shape analyser so that the filter is configured to identify a region in the captured image having both a shape and color indicative of a red-eye phenomenon for subsequent comparison with a reference eye shape characteristic and the reference eye color characteristic, respectively.

In another embodiment, a pixel modifier is included for modifying the color of the pixels within a region indicative of a red-eye phenomenon.

A method in accordance with the present invention is also provided for detecting a red-eye phenomenon within a digital image acquired by a digital image acquisition device having no photographic film. The device includes a portable apparatus for capturing digital images, and a flash unit for providing illumination during image capture. The method includes identifying a region within a captured image indicative of a red-eye phenomenon including comparing the captured image and at least one reference eye color characteristic.

According to one embodiment, the at least one reference eye color characteristic includes an eye color characteristic of a reference image of nominally the same scene taken without flash.

The reference image may be a preview image of lower pixel resolution than the captured image. The method may further include matching the pixel resolutions of the captured and reference images including up-sampling the preview image or sub-sampling the captured image, or a combination thereof.

The method may further include aligning at least portions of the captured image and reference image prior to said comparison.

The method may further include analysing a shape so that the identifying comprises identifying a region in the captured image having both a shape and color indicative of a red-eye phenomenon for subsequent comparison with the corresponding region in the reference image. A shape may be analysed to determine subsequent to the comparison whether a region designated as indicative of a red-eye phenomenon has a shape indicative of a red-eye phenomenon.

The method may also include detecting a region indicative of a red-eye phenomenon by identifying a region in the captured image at least having a color indicative of a red-eye phenomenon and comparing the identified region with the corresponding region in the reference image, and designating the region as indicative of a red-eye phenomenon if the corresponding region does not have a color indicative of a red-eye phenomenon.

The method may also include deciding whether a region has a color indicative of a red-eye phenomenon by determining on a statistical basis as a global operation on the entire region.

The method may also include modifying the color of the pixels within a region indicative of a red-eye phenomenon.

BRIEF DESCRIPTION OF THE DRAWINGS

FIG. 3-e is a enlargement of a hypothetical digitization of an eye in an image.

DESCRIPTION OF A PREFERRED EMBODIMENT

Figure 1:
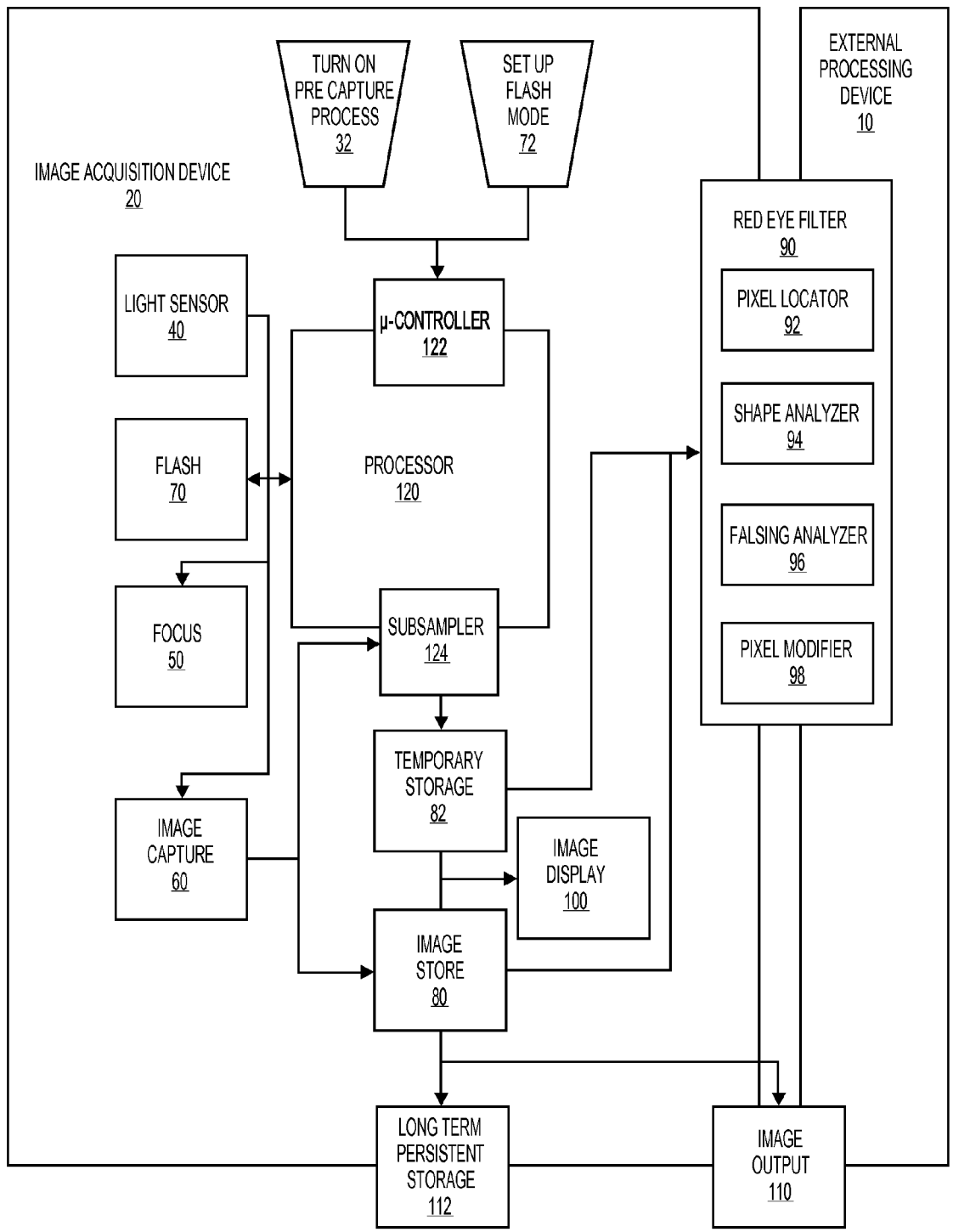
FIG. 1 is a block diagram of a camera apparatus operating in accordance with an embodiment of the present invention.

FIG. 1 shows a block diagram of a image acquisition system such as a digital camera apparatus operating in accordance with the present invention. The digital acquisition device, also generically referred to in this application as a camera 20, includes a processor 120. It can be appreciated that many of the processes implemented in the digital camera may be implemented in or controlled by software operating in a microprocessor (μProc), central processing unit (CPU), controller, digital signal processor (DSP) and/or an application specific integrated circuit (ASIC), collectively depicted as block 120 and termed as "processor". Generically, all user interface and control of peripheral components such as buttons and display is controlled by a μ-controller 122. The processor 120, in response to a user input at 122, such as half pressing a shutter button (pre-capture mode 32), initiates and controls the digital photographic process. Ambient light exposure is determined using light sensor 40 in order to automatically determine if a flash is to be used. The distance to the subject is determined using focusing means 50 which also focuses the image on image capture means 60. If a flash is to be used, processor 120 causes the flash means 70 to generate a photographic flash in substantial coincidence with the recording of the image by image capture means 60 upon full depression of the shutter button. The image capture means 60 digitally records the image in color. The image capture means is known to those familiar with the art and may include a CCD (charge coupled device) or CMOS to facilitate digital recording. The flash may be selectively generated either in response to the light sensor 40 or a manual input 72 from the user of the camera. The image recorded by image capture means 60 is stored in image store means 80 which may comprise computer memory such a dynamic random access memory or a non-volatile memory. The camera is equipped with a display 100, such as an LCD, for preview and post-view of images. In the case of preview images, which are generated in the pre-capture mode 32, the display 100 can assist the user in composing the image, as well as being used to determine focusing and exposure. In case of postview, the image display can assist the user in viewing suspected red-eye regions and to manually decide if the region should be corrected or not after viewing it. A temporary storage space 82 is used to store one or plurality of the preview images and be part of the image store means 80 or a separate component. The preview image is usually generated by the same image capture means 60, and for speed and memory efficiency reasons may be generated by subsampling the image 124 using software which can be part of the general processor 120 or dedicated hardware, before displaying 100 or storing 82 the preview image. Depending on the settings of this hardware subsystem, the pre-acquisition image processing may satisfy some predetermined criteria prior to storing the preview image. Such criteria may be chronological—such as save images every 0.5 seconds; more sophisticated criteria may be analysis of the image for changes, or the detection of faces in the image. A straightforward preferred embodiment is to constantly replace the previous saved preview image with a new captured preview image during the pre-capture mode 32, until the final full resolution image is captured by full depression of the shutter button.

The red-eye filter 90 can be integral to the camera 20 or part of an external processing device 10 such as a desktop computer, a hand held device, a cell phone handset or a server. In this embodiment, the filter receives the captured image from the full resolution image storage 80 as well as one or a plurality of preview images from the temporary storage 82. The filter 90 analyzes the stored image for characteristics of red-eye and, if found, modifies the image and removes the red-eye phenomenon from the image as will be describe in more detail. The red-eye filter includes a pixel locator 92 for locating pixels having a color indicative of red-eye; a shape analyzer 94 for determining if a grouping of at least a portion of the pixels located by the pixel locator comprise a shape indicative of red-eye; an falsing analyzer 96 for processing the image around the grouping for details indicative of an image of an eye; and a pixel modifier 98 for modifying the color of pixels within the grouping. The modified image may be either displayed on image display 100, saved on a persistent storage 112 which can be internal or a removable storage such as CF card, SD card or the like, or downloaded to another device, such as a personal computer, server or printer via image output means 110 which can be tethered or wireless.

In a further embodiment where the red-eye filter 90 is located on an external application in a separate device, 10, such as a desktop computer, the final captured image stored in block 80 along with a representation of the preview image as temporarily stored in 82, may be stored prior to modification on the storage device 112, or transferred together via the image output means 110 onto the external device 10, later to be processed by the red-eye filter 90.

Figure 2:
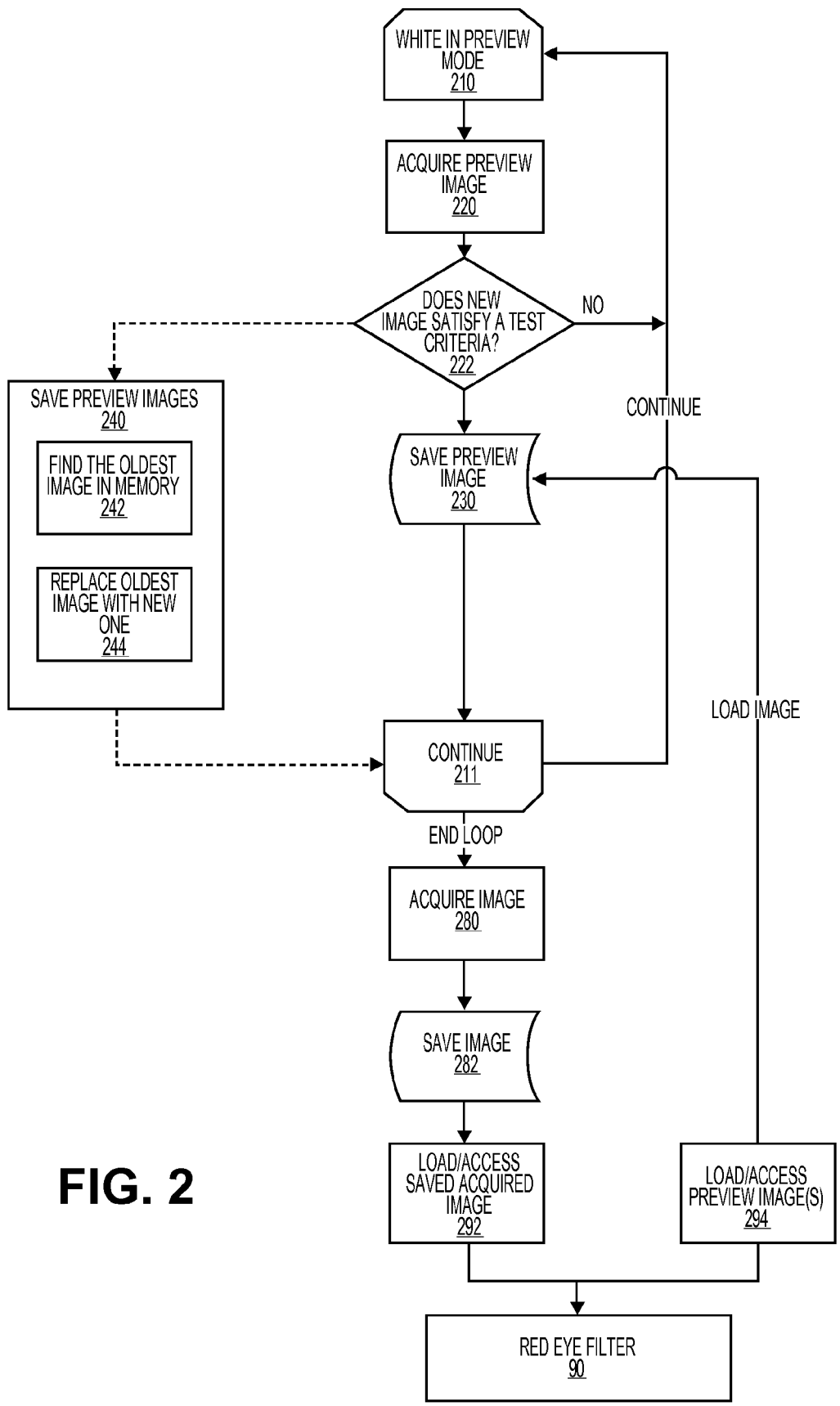
FIG. 2 illustrates the workflow of the initial stage of a red-eye filter using preview data according to the embodiment.

FIG. 2 details the initial stage of the workflow of this embodiment. It will be understood both this initial stage as well as the subsequent red-eye correction stage (See FIGS. 5a to 5d) will typically be performed by software in the camera and/or separate device 10. A preview image (normally of lesser resolution than the final image) is generated while the camera is in the pre-capture mode 32 such as when the user half presses the shutter button. While in this mode, shown in FIG. 2 as the preview mode 210, the camera constantly captures the preview images 220. The capture interval is usually semi-real time which means fractions of a tenth of a second or less. The camera saves each new preview image if it satisfies some test criteria, 122. If not, the camera continues, 211, to capture the next preview image without saving the previous one. The process will continue until the final full resolution image is acquired 280 and saved 282 by fully depressing the shutter button.

In a simple embodiment, if the test criteria are met, or if no test criteria exist, the system will constantly replace the previous saved preview image with the new preview image, 230. Alternatively, where multiple preview images can be saved, 240, the new image will be placed on a chronological FIFO stack, namely First In First Out, where the system continuously captures and saves new preview images 244 while each time clearing the oldest image 242 from the stack, until the user takes the final picture. The reason for storing multiple preview images is based on the fact that the last image, or any single image, may not be the best reference image for comparison with the final full resolution image in the red-eye correction process. By storing multiple images, a better reference image can be achieved, and a closer alignment between the preview and the final captured image can be achieved. This concept will be further discussed in FIGS. 5a to 5c, in the alignment stage 540. Other reasons for capturing multiple images are that a single image may be blurred due to motion, the subject had their eyes closed, the exposure was not set, etc. In a yet alternative embodiment, the multiple images may assist in creating a single higher quality reference image; either higher resolution or by taking different portions of different regions from the multiple images. This concept of sub-pixel resolution may be combined with the upsampling process as described in FIGS. 5a to 5c, block 534.

The test criteria 222 may involve the actual analysis of the preview image content before deciding whether the new preview image should replace a previously saved image. Such criteria may be based on image analysis such as the existence of faces in the image, detection of eyes or metadata analysis such as the exposure condition, whether a flash is going to happen, the distance to the subjects, etc.

As part of the red-eye filter 90 the full resolution image 292 and the preview image or images 294 will be loaded into working memory, 292 and 294, unless they are already in memory in which they will just be accessed through a pointer.

Figure 3A:
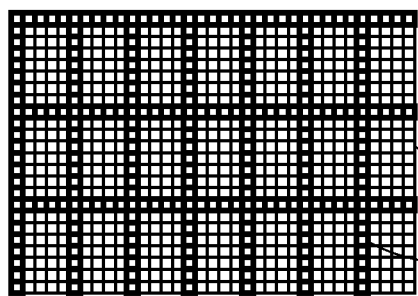
FIGS. 3-a to 3-d illustrates the pixelation process of an image in different resolutions.
Figure 3B:
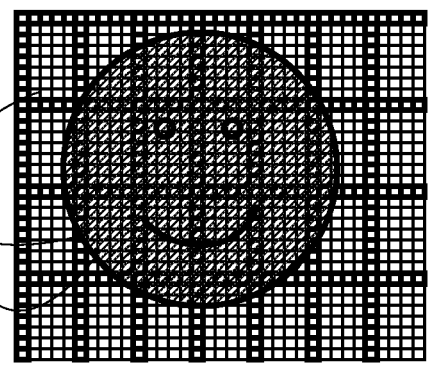
Figure 3C:
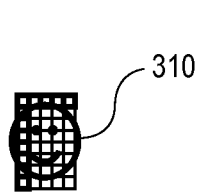
Figure 3D:
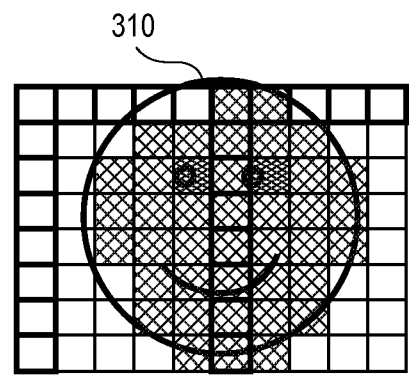
Figure 3E:
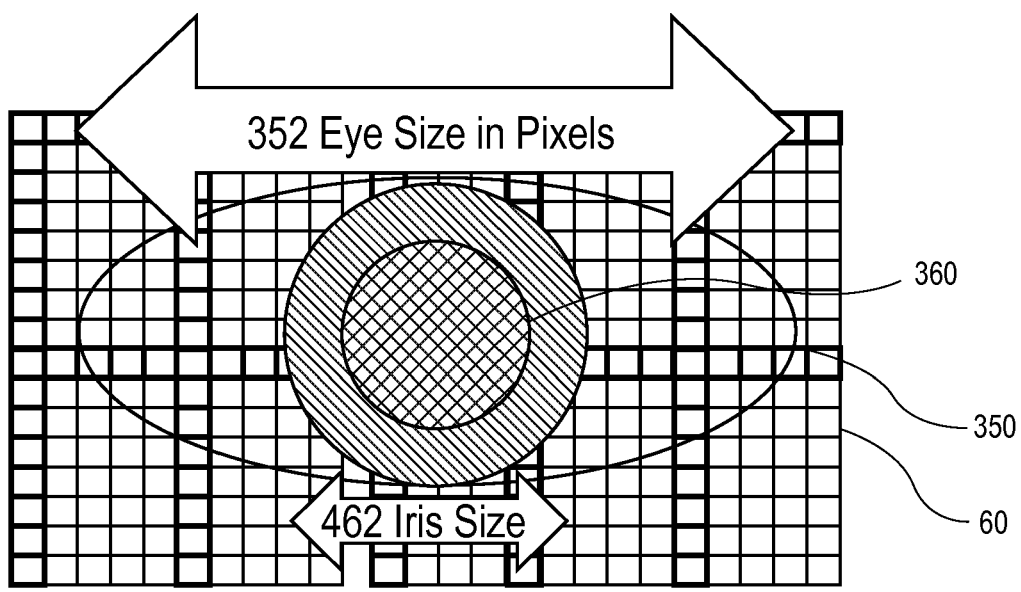

Referring to FIGS. 3a-3e, the digitization process in various resolutions is explained and depicted. FIG. 3a illustrates the grid like nature of a sensor as illustrated in FIG. 1, block 60. The sensor comprises multiple cells 302 which determine the camera resolution. For example a sensor of 2000×3000 cells will be a 6 Million pixel sensor (it will be understood that each cell in fact comprises a plurality of individual sensor elements sensitive to different colors, e.g. RGB or RGBG, to create each colored image pixel).

FIG. 3-b depicts the optical projection of a face 310 onto the sensor 60. Each of the cells 302 records the average light information it receives for the image. This is the process of digitization and quantization.

The degree of details is determined by the resolution of the sensor as depicted in FIG. 3-c. In this illustration a much smaller sensor is used, and in this case the same face 310 is digitized into a smaller number of pixels, or alternatively subsampled from the full resolution sensor data into a smaller number of pixel representations.

FIG. 3-d describes the inverse process where the subsampled image of FIG. 3-c is upsampled to the same size as the original. When comparing the resolution, naturally the some of the details are lost in this process. For illustrative example, while in FIG. 3-b the face was roughly 25×25=625 pixels, in FIG. 3-d the face is made of only 5×5=25 pixels.

Of course, the above are only for illustration purposes. In practice, due to the larger resolution of the sensors than in this illustration, a normal eye will be depicted by a much larger pixel count to be noticeable. FIG. 3-e displays such a digitized eye. In this figure, an eye 350, as imaged on a sensor 60, will consist of roughly 25 pixels wide, 352. In particular interest for this invention the inner portion, the iris 360, in this case will be roughly 8 pixels in diameter, as illustrated in 462.

Figure 5A:
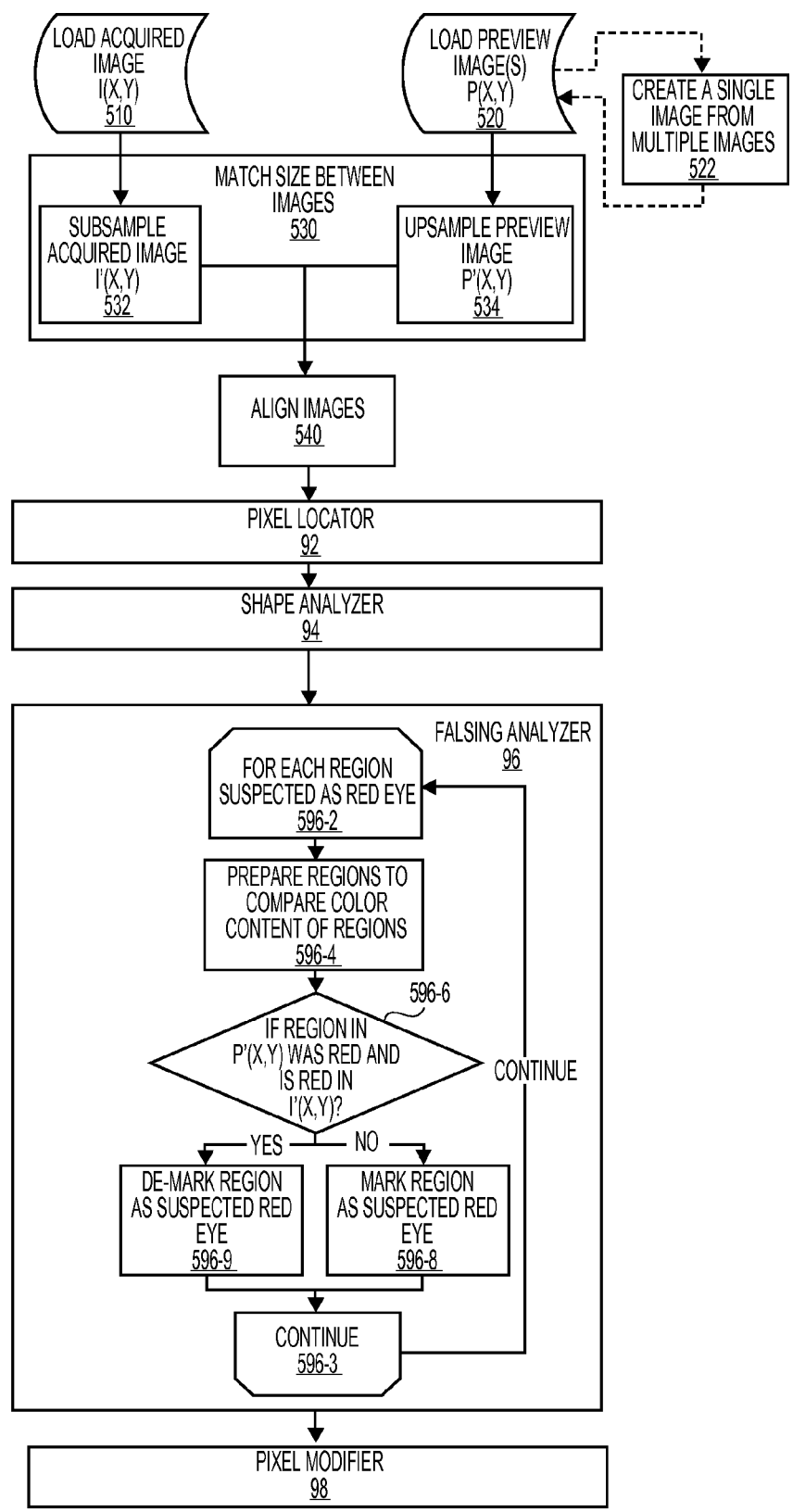
FIGS. 5-a to 5-d and 6-a and 6-b illustrate the detailed workflow of the red-eye filter according to the embodiment, and alternatives.
Figure 5B:
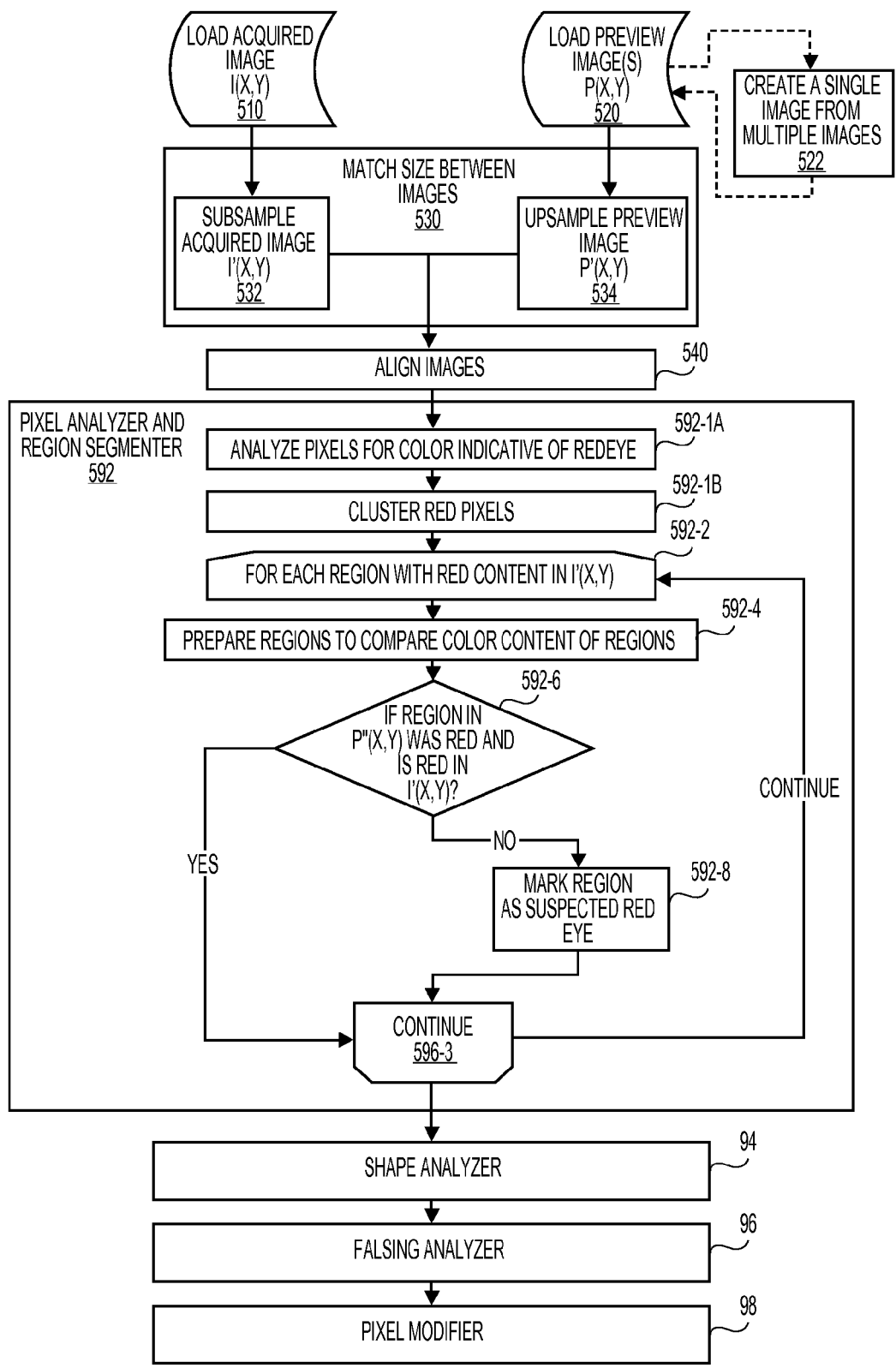
Figure 5C:
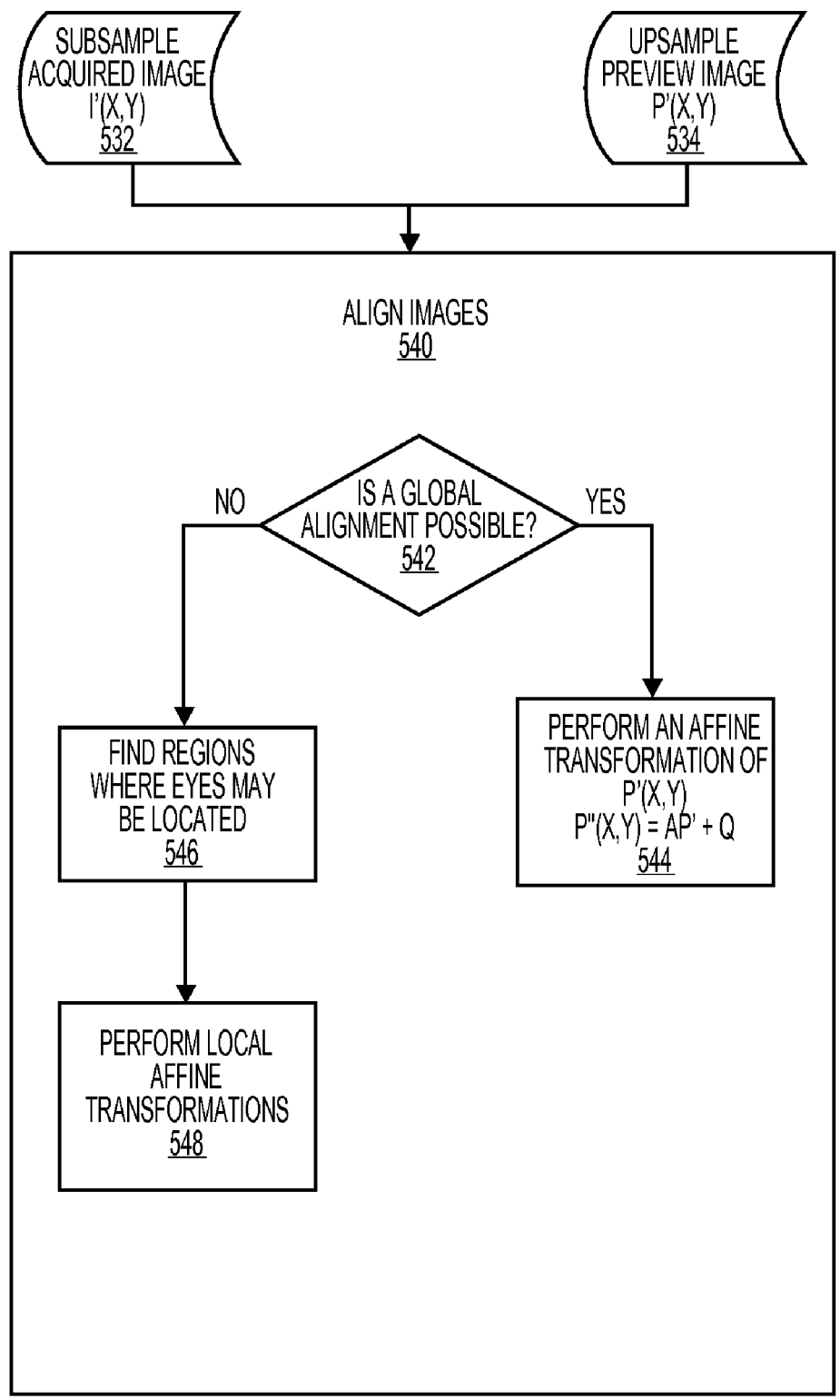
Figure 5D:
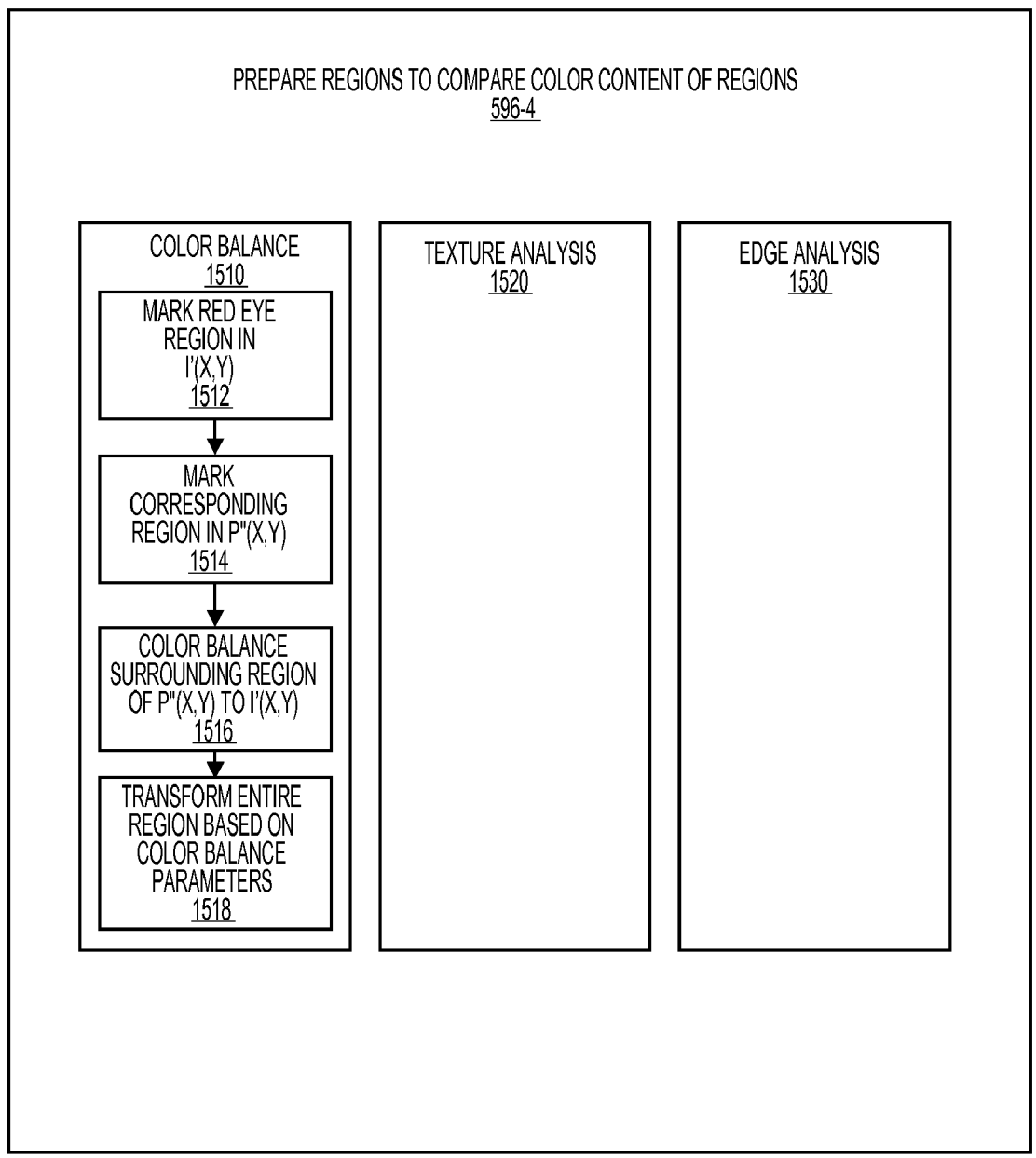

According to a preferred embodiment of this invention, the preview image and the final image, or portions of them, need to be aligned as depicted in FIGS. 5a to 5c, block 540. As explained above, the reference image and the final image may have different resolutions. The discrepancy in resolution may lead to differences in content, or pixel values, even though no data was changed in the subject image. In particular, edge regions when downsampled and then upsampled may have a blurring or an averaging effect on the pixels. Thus direct comparison of different resolution images, even when aligned, may lead to false contouring. In addition, the reference image may be acquired prior to or after the final image is captured. Due to the above reasons, there is a need to match the two images, both in content and pixel resolution, as described below.

Figure 4:
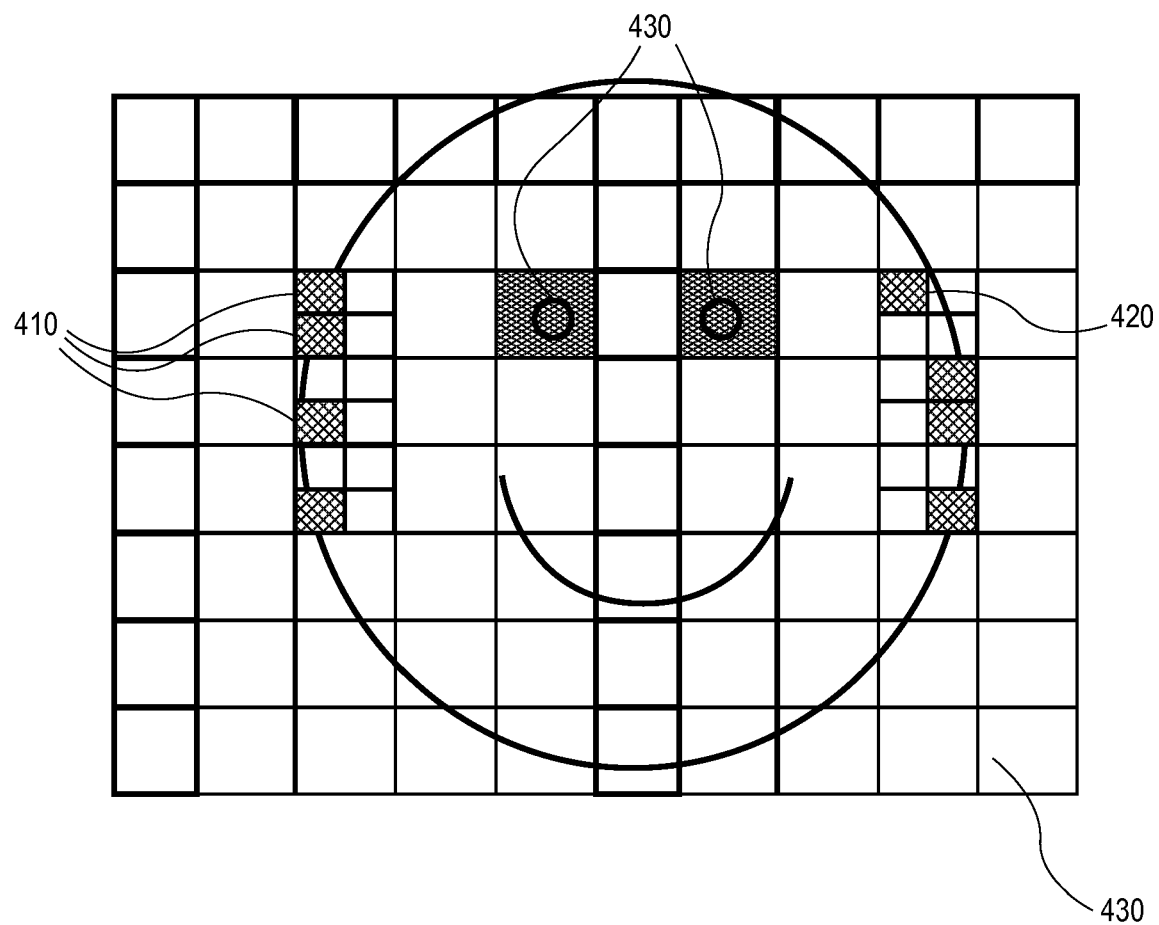
FIG. 4. illustrates the pixel differences between a red-eye image and a non red-eye image.

FIG. 4 better illustrates the effect of the sub- and up-sample process in finding the difference pixelwise between two images. In this case, the input images are the ones illustrated in FIGS. 3-b and 3-d respectively high resolution and low resolution. In this figure, white squares such as 430 means that there is no difference between the two. Checkered squares or pixels, such as 420 means that there is a difference between the images.

The flat regions should display no significant differences due to resolution changes. The main difference will be caused be two reasons namely edge regions where changes in value occur such as in blocks 410. However, there is another cause for difference which is of interest to this invention and displayed in 430. In these pixels, the difference is caused by the actual change in the color of the eye from normal eyes to red-eyes. Not only is there a change in the pixel value but the change is also more specifically reflected as change to a red or light color from the normal color of the iris or form the black color of the pupil.

FIGS. 5-*a* to 5-d illustrate the workflow of the red-eye filter 90 of this embodiment, as well as variations thereof.

Referring first to FIG. 5-*a*, there are two input images into the filter, namely a full resolution image 510, I(x,y) which is the one that was captured by full depression of the shutter button and needs to be analyzed for red-eye artefacts, and a preview image 520, P(x,y) which is used as a reference image and is nominally the same scene as the image I(x,y) but taken without the flash. The preview image may be a result of some image processing taking into account multiple preview images and creating a single image, 522. Methods of improving image quality based on multiple images are familiar to those versed in the art of image processing. The resulting output from the analysis process of 522 is a single preview image.

The preview image 520 is normally, but not necessarily, of lower resolution than the full resolution image 510, typically being generated by clocking out a subset of the sensor cells or by averaging the raw sensor data. Therefore, the two images, or alternatively the relevant regions in the images (i.e. the regions containing or suspected to contain eyes, which can be determined by image processing techniques known in the art), need to be matched in pixel resolution, 530. In the present context "pixel resolution" means the size of the image, or relevant region, in terms of the number of pixels constituting the image or region concerned. Such a process may be done by either upsampling the preview image, 534, downsampling the acquired image, 532, or a combination thereof. Those familiar in the art will be aware of several techniques best used for such sampling methods. The result of step 530 is a pair of images I'(x,y) and P'(x,y) corresponding to the original images I(x,y) and P(x,y), or relevant regions thereof, with matching pixel resolution. The system and method of the preferred embodiment involves the detection and removal of red-eye artefacts. The actual removal of the red-eye will eventually be performed on the full resolution image. However, all or portions of the detection of red-eye candidate pixel groupings, the subsequent testing of said pixel groupings for determining false red-eye groupings, and the initial step of the removal, where the image is presented to the user for user confirmation of the correction, can be performed on the entire image, the subsampled image, or a subset of regions of the entire image or the subsampled image.

Although nominally of the same scene, the preview image and the finally acquired full resolution image may differ spatially due to the temporal lag between capturing the two images. Therefore, the two images, or relevant regions thereof, may need to be aligned, 540, especially in respect of regions of the images containing or suspected to contain eyes. Essentially, alignment means transforming at least one of the images, and in this embodiment the preview image P'(x,y), to obtain maximum correlation between the images, or relevant regions thereof, based on measurable characteristics such as color, texture, edge analysis. Those familiar in the art are aware of several algorithms to achieve such alignment; see, for example, U.S. Pat. No. 6,295,367 which is hereby incorporated by reference and which describes alignment of images due to object and camera movement, and U.S. Pat. No. 5,933,546, which is also hereby incorporated by reference and which addresses the use of multi-resolution data for pattern matching.

Further discussion on the alignment is presented in FIG. 5-*c*. In this Figure, the inputs are the two images I'(x,y) and P'(x,y) as defined in FIG. 5-*a*. The alignment may be global for the entire image or local for specific regions. For example, a simple linear alignment, such as a shift in the horizontal direction by H pixels, and/or in the vertical direction by V pixels, or a combination of the two. Mathematically, the shifted image, P"(x,y), can be described as:

$$P''(x,y) = P'(x-H, y-V)$$

However, simple translation operation may not suffice in the need to align the image. Therefore, there may be a need for X-Y shearing, which is a symmetrical shift of the object's points in the direction of the axis to correct for perspective changes; X-Y tapering where the object is pinched by shifting its coordinates towards the axis, the greater the magnitude of the coordinate the further the shift; or rotation around an arbitrary point.

In general, the alignment process may involve an affine transformation, defined as a special class of projective transformations that do not move any objects from the affine space $\mathbb{R}^3$ to the plane at infinity or conversely, or any transformation that preserves collinearity (i.e. all points lying on a line initially still lie on a line after transformation) and ratios of distances (e.g., the midpoint of a line segment remains the midpoint after transformation). Geometric contraction, expansion, dilation, reflection, rotation, shear, similarity transformations, spiral similarities and translation are all affine transformations, as are their combinations. In general, the alignment 540 may be achieved via an affine transformation which is a composition of rotations, translations, dilations, and shears, all well-known to one familiar in the art of image processing.

If it is determined through a correlation process that a global transformation suffices, as determined in block 542=YES, one of the images, and for simplicity the preview image, will undergo an affine transformation, 544, to align itself with the final full resolution image. Mathematically, this transformation can be depicted as:

$$P'' = AP' + q$$

where A is a linear transformation and q is a translation.

However, in some cases a global transformation may not work well, in particular for cases where the subject matter moved, as could happen when photographing animated objects. In such case, in particular in images with multiple human subjects, and when the subjects move in independent fashion, the process of alignment 540 may be broken down, 546, to numerous local regions each with its own affine transformation. What is important is to align the eyes between the images. Therefore, according to this alternative, one or multiple local alignments may be performed, 548, for regions in the vicinity surrounding the eyes, such as faces.

Only after the images are aligned can one compare the potential red-eye colors.

In the preferred embodiment of FIG. 5-*a*, the preview image information is used as part of the falsing stage 96. Blocks 92, 94 and 98 correspond to the same blocks in FIG. 1, being the stages of pixel locator, shape analyzer and pixel modification respectively. This embodiment can incorporate pixel locator 92, shape analyzer 94 and pixel modifier 98 as described in U.S. Pat. No. 6,407,777 (DeLuca), incorporated by reference above, the functions of the pixel locator 92 and shape analyzer 94 being performed on the image I'(x,y) and the pixel modifier 98 operating on the original acquired image I(x,y). Block 96, which is the falsing stage, is improved in this embodiment as compared to the falsing stage of DeLuca.

Referring to block 96, for each region of the image I'(x,y) suspected as red-eye, step 596-2, as identified by steps 92 and 94, the suspected region is tested by comparing the pixel values of the region with the pixel values of the corresponding region in the aligned preview image P"(x,y), 596-6. However, prior to doing so, the regions need to be prepared and modified for such comparison, 596-4.

Due to the fact that the regions may not match exactly, a pixel-by-pixel comparison may not suffice. The reason for the mismatch may occur due to the original size discrepancy. For example, in edges this phenomenon is graphically illustrated in FIG. 4. Other reasons for a mismatch are potential movement of the object, or there may be some averaging that is done in the low resolution preview image that may loose high frequency color data. Such effects are referred to as smoothing and aliasing. In addition, even if the alignment is optimal, there may be sub-pixel alignment that can not be accounted for. Moreover, there may be color differences between the preview image, shot using available light and the acquired full resolution image which is shot using flash. In many cases, the color transformation between one image to another is not global and uniform. Therefore, the process of preparing the regions for comparison.

This process as illustrated in block 596-4 will be further described in FIG. 5-d. The underlying concept behind step 596-4 is to distinguish between differences that are caused due to the acquisition process and the differences that are caused due to the existence of red-eye in the image. This problem is well known to one familiar in the art of statistical pattern matching and scene analysis and image recognition. An example of such an application taking into account differences due to resolution is described in U.S. Pat. No. 5,933,546, which is hereby incorporated by reference.

If a region in the aligned preview image P"(x,y) was red and the equivalent region is red in the image I'(x,y), 596-6, that region will be eliminated from I'(x,y) as a red-eye artefact, 596-9, and the corresponding region will be eliminated as a red-eye artefact from the original full resolution image I(x,y). Otherwise, the region will continue to remain suspected as red-eye, 596-8. The process will continue, 596-3, for all suspected regions.

The comparison of the regions for a color value is done as a global operation on the entire region, and the answer to the question of whether a region is red or not is made statistically for the entire region and not pixel by pixel, i.e. it does not depend on the value of any particular individual pixel. Such approach will account for inconsistencies on the pixel level that may be resolved statistically when analyzing a larger collection of pixels consisting of a region. For example, some regions of the eye may not be fully red, or display other artefacts such as a glint of high luminance. Other example for the need of a global statistical operation is the presence of noise in the image. Techniques are known in the art for such global comparison.

Based on the information above, the regions finally identified as red-eye artefacts can be modified, 98, to eliminate the red-eye from the original full resolution image I(x,y). The modification can be done using any one of numerous available techniques such as luminance reduction, chrominance reduction, or subtraction of the artefact, as described in US Published Patent Application 2002/0150306 (Baron), which is hereby incorporated by reference.

FIG. 5-d describes the preparation of regions suspected of red-eye for comparison as described in FIG. 5-a, block 596-4. As discussed above, a simple pixel level comparison may not be enough to determine whether the region is not of red-eye nature. The process of preparation may include a combination of several components such as creating color balance between the regions of the preview image and the final image, 1510, analyzing the texture, or differences in high frequency patterns between the two regions that may have occurred due to the change in resolution, 1520, and comparing the edges between the two regions, 1530, where the differences may have occurred due to change in exposure, color balance, resolution or alignment, and in particular sub pixel alignment. The color balance step 1510 comprises marking each red-eye region in I'(x,y) and the corresponding region in P"(x,y), steps 1512 and 1514, determining the difference in color balance between the region in I'(x,y) surrounding, but not including, the suspected red-eye region and the corresponding region of P"(x,y), step 1516, and transforming the entire region, including the suspected red-eye region, based on the color balance difference so determined, step 1518.

As an alternative embodiment of this invention, the preview image can be used as part of the pixel locator stage 92, as illustrated in FIG. 5-b, rather than as part of the falsing analyzer 96.

In FIG. 5-b, blocks 510, 520, 522, 530, 532, 534, 540, 94 and 98 are identical to those in FIG. 5-a. According to this embodiment, the use of the preview image in order to detect red-eye artefacts is implemented as part of the red-eye identification process, otherwise described as the pixel locator 92 in FIG. 1 but here identified as Pixel Analyser and Region Segmenter 592.

After the suspected red-eye regions are identified, the process continues via the shape analysis 94, false detection elimination 96 and correction 98 as described in FIG. 1. In this case, the falsing detector 96 may be performed according to DeLuca.

According to this embodiment, after the alignment step 540 the following steps 592-1a and 592-1b analyse both images I'(x,y) and P"(x,y) for the presence of pixels having a color indicative of red-eye (592-1a), for example in the manner of DeLuca, and then identifies clusters of contiguous red pixels so detected (592-1b). This is known as segmentation and is more fully described in US Pat. Appn. 2002/0176623, which is hereby incorporated by reference.

Now, each region (cluster) with red content in the acquired image I'(x,y), step 592-2, is compared with the corresponding region in the aligned preview image P"(x,y). The regions will need to be prepared, 592-4, as previously described in relation to block 596-4 of FIG. 5-a. If the regions are red in both cases, 592-6=YES, the region will not be marked as red-eye, no action will be taken and the process will continue to the next suspected region, 592-3. If the region is red in the acquired image I'(x,y) while the corresponding region is not red in the preview image P"(x,y), 592-6=NO, then the region will be marked as suspected red-eye, 592-8.

Figure 6A:
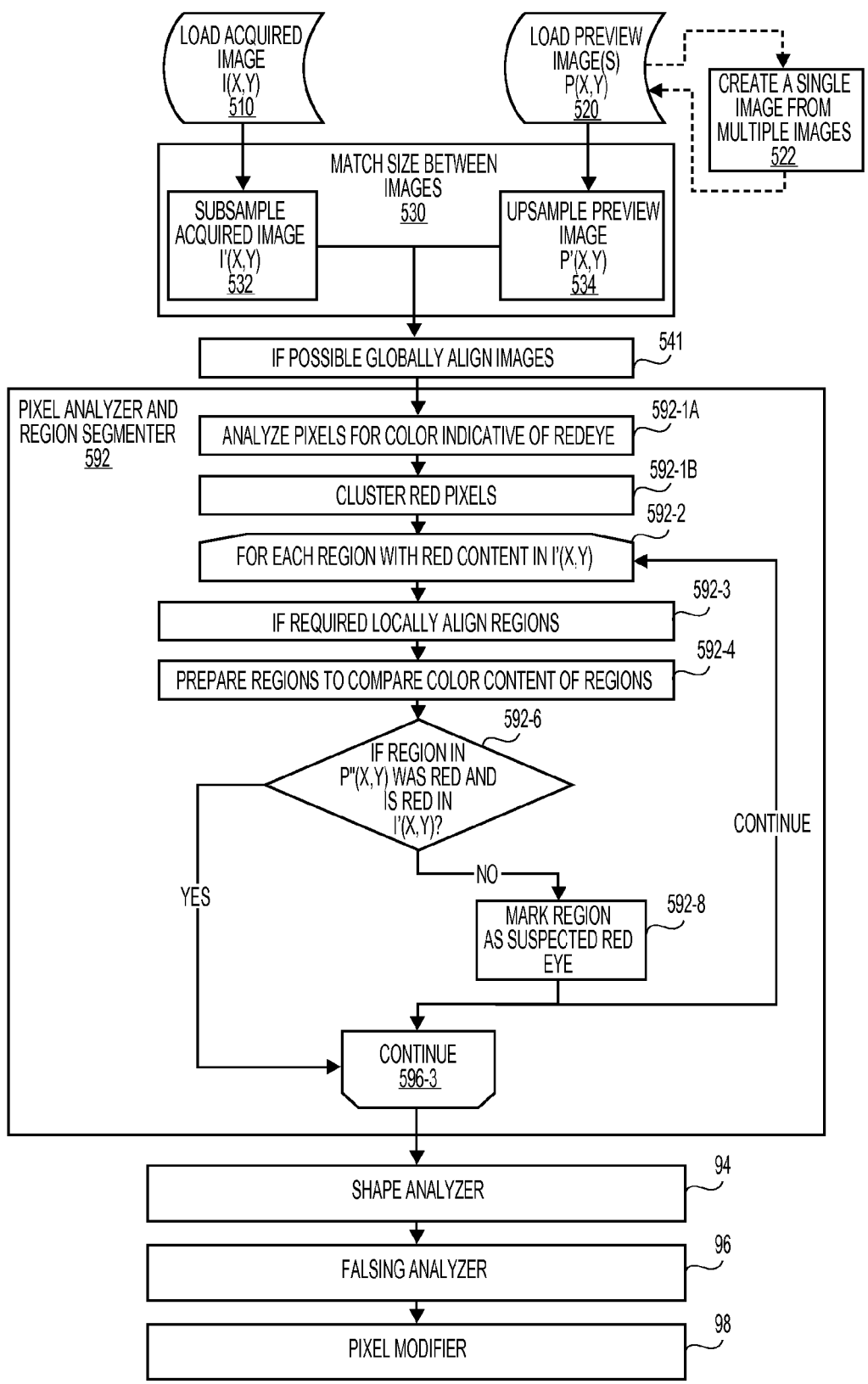
Figure 6B:
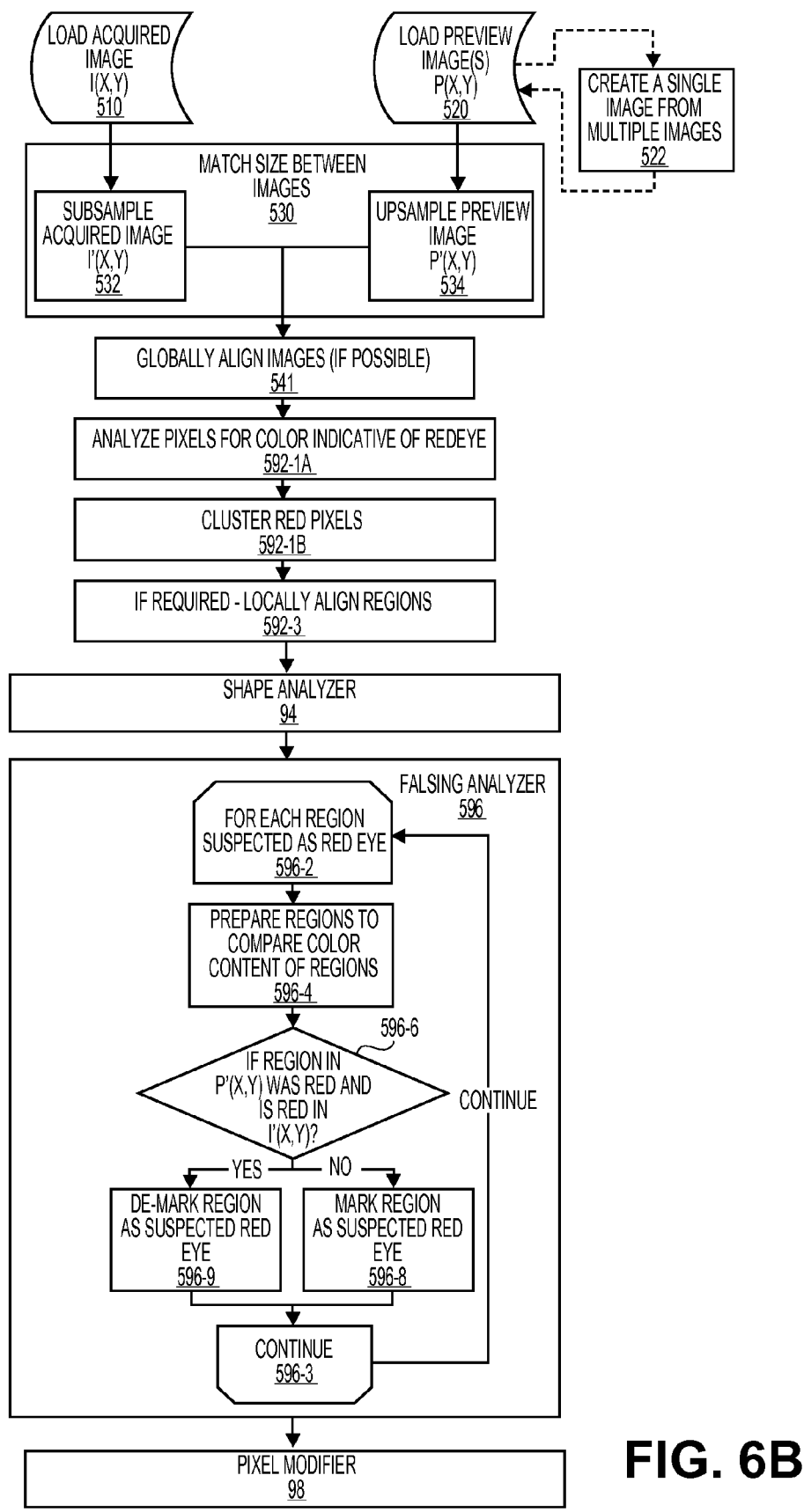

FIGS. 6A-6B show a modification of the embodiment of FIGS. 5A-5B in which Step 540 (Align Images) has been divided into two steps, Step 541 (If Possible Globally Align Images) and Step 592-3 (If Required Locally Align Images). Step 541 corresponds to Steps 542 and 544 of FIG. 5C. However, if a global alignment is not possible or practical, the local alignment is deferred until after red pixel identification and clustering has been performed, since the presence of such clusters in the two images I'(x,y) and P'(x,y) will assist in the local alignment.

In the embodiments of the invention, in the comparison stages, 592-6 and 596-6 the pixel values do not necessarily have to be compared with red but may alternatively or additionally be compared with other values such as yellow, white, pink, brown or other color indicative of a red-eye phenomenon, or to a range of values, to accommodate other flash related eye artefacts that are not purely red. Due to the fact that the eye surface is retro-reflective (due to the smoothness created by the tears, and the spherical shape of the eyeball), the technique as described in this specification can assist in the detection of the eyes in an image. Such existence of an eye can be found by comparison of the spectral reflection of the flash in the eye with the same region where no flash was used, and thus without spectral reflection. This comparison may assist in locating eyes in general and not just eyes with red-eye artefacts. This process may be implemented by finding the change of small specular reflections that occur in the eye region when flash illumination is used such as described in WO 03/026278 (Jarman). The specular reflections may be used as another indication of suspected regions as defined in blocks 592-2 and 596-2 by comparing the specular reflection of the flash image with no specular reflection of the preview image.

Alternatively to a binary decision of adding or eliminating a region, 596-8 and 596-9, in the case of a continuous probability for each region, the process will be revised from a binary decision to changing a probability decision. The quantitative determination of such change in probability may be decided based on analysis of the confidence level of the comparison 592-4 and 596-4.

The preferred embodiments described above may be modified by adding or changing operations, steps and/or components in many ways to produce advantageous alternative embodiments. For example, the reference image can be a post-view image rather than a preview image, i.e. an image taken without flash immediately after the flash picture is taken.

A red-eye correction procedure may begin as described by block 92 with detecting a human face in a digital image and, based on this detection, finding the eyes in the face (see, e.g., U.S. Pat. No. 6,252,976, U.S. Publ. Pat. App. No. 2003/0044070 and U.S. Pat. No. 6,278,491, which are hereby incorporated by reference). This procedure may also be used for creating the regional alignment 546 and color balance 1510.

A range of alternative techniques may be employed to detect and verify the existence of red-eye defects in an image (see, e.g., U.S. Publ. Pat. Apps. No. 2003/0044177 and 2003/0044178, which are hereby incorporated by reference). These techniques may be incorporated into the pixel locator, shape analyzer, falsing analyzer and pixel modifier corresponding to blocks 92, 94, 96 and 98. A camera may include software or firmware for automatically detecting a red-eye image using a variety of image characteristics such as image brightness, contrast, the presence of human skin and related colors. The analysis of these image characteristics may be utilized, based on certain pre-determined statistical thresholds, to decide if red-eye defects exist and if a flash was used to take the original image.

The preferred embodiments described herein may involve expanded digital acquisition technology that inherently involves digital cameras, but that may be integrated with other devices such as cell-phones equipped with an acquisition component, toy cameras etc. The digital camera or other image acquisition device of the preferred embodiment has the capability to record not only image data, but also additional data referred to as meta-data. The file header of an image file, such as JPEG, TIFF, JPEG-2000, etc., may include capture information including the preview image, for processing and red-eye detection at a later post processing stage, which may be performed in the acquisition device or in a separate device such as a personal computer. The preferred embodiments described herein serve to improve the detection of red-eyes in images, while eliminating or reducing the occurrence of false positives, and to improve the correction of the detected artefacts.

While an exemplary drawing and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention, as set forth in the claims below and structural and functional equivalents thereof.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, unless expressly set forth or understood by those skilled in the art being necessary.

Thus, the preferred embodiments described herein provide an improved method and apparatus for detecting red-eye phenomenon within images taken by a digital camera having a flash while eliminating or reducing the occurrence of false positives by using preview information.

In addition to all of the references cited above that have been incorporated by reference, the sections entitled BACKGROUND, SUMMARY OF THE INVENTION, ABSTRACT and BRIEF DESCRIPTION OF THE DRAWINGS, are hereby incorporated by reference into the DETAILED DESCRIPTION OF THE PREFERRED EMBODIMENT.

What is claimed is:

1. A digital image acquisition system having no photographic film, comprising
   a portable apparatus for capturing digital images, a flash unit for providing illumination during image capture, and a red-eye filter for detecting red-eye phenomenon in a captured image based upon a comparison of said captured image and
   a reference image of nominally the same scene taken without flash, wherein the red eye filter further includes an alignment filter configured to align for aligning at least portions of the captured image and reference image prior to said comparison, and to match the pixel resolutions of the captured and reference images by up-sampling the preview image or sub-sampling the captured image, or a combination thereof,
   wherein the red eye filter detects said red-eye phenomenon by identifying a region in the captured image having a color indicative of a red-eye phenomenon and comparing said identified region with the corresponding region in the reference image,
   wherein the red eye filter further designates said region as indicative of a red-eye phenomenon if said corresponding region does not have a color indicative of a red-eye phenomenon.

2. A digital image acquisition system having no photographic film, comprising a portable apparatus for capturing digital images, a flash unit for providing illumination during image capture, and a red-eye filter for detecting red-eye phenomenon in a captured image based upon a comparison of said captured image and a reference image of nominally the same scene taken without flash, wherein the red eye filter further includes an alignment filter configured to align at least portions of the captured image and reference image prior to said comparison, wherein the red eye filter detects said red-eye phenomenon by identifying a region in the captured image having a color indicative of a red-eye phenomenon and comparing said identified region with the corresponding region in the reference image, wherein the red eye filter further designates said region as indicative of a red-eye phenomenon if said corresponding region does not have a color indicative of a red-eye phenomenon, and, wherein the decision as to whether a region has a color indicative of a red-eye phenomenon is determined on a statistical basis as a global operation on the entire region.

3. A digital image acquisition system having no photographic film, comprising a portable apparatus for capturing digital images, a flash unit for providing illumination during image capture, and a red-eye filter for detecting red-eye phenomenon in a captured image based upon a comparison of said captured image and a reference image of nominally the same scene taken without flash, wherein the red eye filter is configured to detect said red-eye phenomenon by identifying a region in the captured image having a color indicative of a red-eye phenomenon and comparing said identified region with the corresponding region in the reference image, wherein the red eye filter further designates said region as indicative of a red-eye phenomenon if said corresponding region does not have a color indicative of a red-eye phenomenon, wherein the decision as to whether a region has a color indicative of a red-eye phenomenon is determined on a statistical basis as a global operation on the entire region.

4. A digital image acquisition system having no photographic film, comprising a portable apparatus for capturing digital images, a flash unit for providing illumination during image capture, and a red-eye filter for detecting red-eye phenomenon in a captured image based upon a comparison of said captured image and a reference image of nominally the same scene taken without flash, wherein the red eye filter is configured to detect said red-eye phenomenon by identifying a region in the captured image having a color indicative of a red-eye phenomenon and comparing said identified region with the corresponding region in the reference image, wherein the red eye filter further designates said region as indicative of a red-eye phenomenon if said corresponding region does not have a color indicative of a red-eye phenomenon, wherein the decision as to whether a region has a color indicative of a red-eye phenomenon is determined on a statistical basis as a global operation on the entire region.

5. A portable apparatus for capturing digital images, comprising
  optics and a sensor, a flash unit, a processor and a red eye filter, wherein the apparatus comprises processor-readable code embedded in one or more media for programming the processor to detect a red-eye phenomenon within a digital image captured by the apparatus, and to identify a region within a captured image indicative of a red-eye phenomenon by comparing said captured image and at least one reference eye color characteristic and at least one reference eye shape characteristic,
  wherein the red eye filter detects said red-eye phenomenon by identifying a region in the captured image having a color indicative of a red-eye phenomenon and comparing said identified region with the corresponding reference eye color characteristic,
  wherein the red eye filter further designates said region as indicative of a red-eye phenomenon if said corresponding region does not have a said reference eye color characteristic indicative of said red-eye phenomenon.

6. The apparatus of claim 5, wherein said at least one reference eye color characteristic comprises an eye color characteristic of a reference image of nominally the same scene taken without flash, and wherein the reference image is a preview image of lower pixel resolution than the captured image, the one or more media having code further for programming the processor to match the pixel resolutions of the captured and reference images by up-sampling the preview image or sub-sampling the captured image, or a combination thereof.

7. The apparatus of claim 6, wherein the one or more media having code further for programming the processor to align at least portions of the captured image and reference image prior to said comparing.

8. The apparatus of claim 7, wherein the one or more media having code further for programming the processor to analyze a shape and to identify a region in the captured image having both a shape and color indicative of a red-eye phenomenon for subsequent comparison with the corresponding region in the reference image.

9. The apparatus of claim 7, wherein the one or more media having code further for programming the processor to analyze a shape to determine subsequent to said comparison whether a region designated as indicative of a red-eye phenomenon has a shape indicative of a red-eye phenomenon.

10. The apparatus of claim 6, wherein said digital image acquisition system comprises a combination of a digital camera and an external processing device.

11. The apparatus of claim 10, wherein said red-eye filter is located in said external processing device.

12. The apparatus of claim 6, wherein the method further comprises modifying the color of the pixels within a region indicative of a red-eye phenomenon.

13. The apparatus of claim 12, wherein said at least one reference eye color characteristic comprises an eye color characteristic of a reference image of nominally the same scene taken without flash, and the one or more media having code further for programming the processor to align at least portions of the captured image and reference image prior to said comparison.

14. The apparatus of claim 13, wherein the one or more media having code further for programming the processor to analyze a shape so that the processor identifies a region in the captured image having both a shape and color indicative of a red-eye phenomenon for subsequent comparison with the corresponding region in the reference image.

15. The apparatus of claim 14, wherein the one or more media having code further for programming the processor to analyze a shape to determine subsequent to said comparison whether a region designated as indicative of a red-eye phenomenon has a shape indicative of a red-eye phenomenon.

16. The apparatus of claim 12, wherein the method further comprises detecting said region indicative of a red-eye phenomenon by identifying a region in the captured image at least having a color indicative of a red-eye phenomenon and comparing said identified region with the corresponding region in the reference image, and designating said region as indicative of a red-eye phenomenon if said corresponding region does not have a color indicative of a red-eye phenomenon.

17. The apparatus of claim 5, wherein the one or more media having code further for programming the processor to analyze a shape so that the processor identifies a region in the captured image having both a shape and color indicative of a red-eye phenomenon.

18. The apparatus of claim 5, wherein the one or more media further for programming the processor to analyze shape to determine whether a region designated as indicative of a red-eye phenomenon has a shape indicative of a red-eye phenomenon.

19. The apparatus of claim 5, wherein said digital image acquisition system comprises a digital camera.

20. The apparatus of claim 5, wherein the one or more media further method further comprises analysing a shape, so that the processor identifies a region in the captured image having both a shape and color indicative of a red-eye phenomenon for subsequent comparison with a reference eye shape characteristic and the reference eye color characteristic, respectively.

21. The apparatus of claim 20, wherein one or more media having code further for programming the processor to modify the color of the pixels within a region indicative of a red-eye phenomenon.

22. The apparatus of claim 5, wherein the one or more media having code further for programming the processor to modify the color of the pixels within a region indicative of a red-eye phenomenon.

23. A portable apparatus for capturing digital images, comprising optics and a sensor, a flash unit, a processor and a red eye filter, wherein the apparatus comprises processor-readable code embedded in one or more media for programming the processor to detect a red-eye phenomenon within a digital image taken with flash and captured by the apparatus, and to identify a region within a captured image indicative of a red-eye phenomenon by comparing said captured image and at least one reference image taken without flash, and to detect said region indicative of a red-eye phenomenon by identifying a region in the captured image at least having a color indicative of a red-eye phenomenon and comparing said identified region with the corresponding region in the reference image, and designating said region as indicative of a red-eye phenomenon if said corresponding region does not have a color indicative of a red-eye phenomenon, and the one or more media further for programming the processor to determine whether a region has a color indicative of a red-eye phenomenon on a statistical basis as a global operation on the entire region.

* * * * *